United States Patent
Wu et al.

(10) Patent No.: US 10,324,904 B2
(45) Date of Patent: Jun. 18, 2019

(54) CONVERTING COMPLEX STRUCTURE OBJECTS INTO FLATTENED DATA

(71) Applicant: EMC Corporation, Hopinkton, MA (US)

(72) Inventors: Eric Wu, Shanghai (CN); Jing Ding, Shanghai (CN); Yourong Wang, Shanghai (CN); Yujie Xie, Shanghai (CN); Yingyan Zheng, Shanghai (CN); Zhidong Mao, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 279 days.

(21) Appl. No.: 15/280,811

(22) Filed: Sep. 29, 2016

(65) Prior Publication Data

US 2017/0091220 A1  Mar. 30, 2017

(30) Foreign Application Priority Data

Sep. 30, 2015  (CN) .................. 2015 1 06421719

(51) Int. Cl.
*G06F 16/11* (2019.01)
*G06F 16/178* (2019.01)
*G06F 16/182* (2019.01)

(52) U.S. Cl.
CPC ........ *G06F 16/1794* (2019.01); *G06F 16/116* (2019.01); *G06F 16/128* (2019.01); *G06F 16/182* (2019.01)

(58) Field of Classification Search
CPC ......... G06F 17/30179; G06F 17/30088; G06F 17/30194; G06F 17/30575; G06F 2201/84
USPC ........................................... 707/639
See application file for complete search history.

(56) References Cited

U.S. PATENT DOCUMENTS

| 7,058,657 | B1 | 6/2006 | Bemo |
| 7,308,449 | B2 | 12/2007 | Fairweather |
| 7,620,526 | B2 * | 11/2009 | Back ................ G01N 33/94 703/1 |
| 7,685,083 | B2 | 3/2010 | Fairweather |
| 8,381,300 | B2 * | 2/2013 | Dai ..................... G06F 21/56 726/24 |
| 8,806,160 | B2 * | 8/2014 | Colgrove ............ G06F 3/0608 711/162 |
| 10,057,273 | B1 * | 8/2018 | Chakraborty ........ H04L 63/105 |
| 2010/0299438 | A1 * | 11/2010 | Zimmerman ...... H04N 7/17318 709/226 |

(Continued)

*Primary Examiner* — Hosain T Alam
*Assistant Examiner* — Nicholas E Allen
(74) *Attorney, Agent, or Firm* — BainwoodHuang

(57) ABSTRACT

Examples are generally directed towards converting complex structure attributes into flattened data. A configuration capture component analyzes a set of objects associated with a set of complex structure attributes. A complex structure attribute is an attribute of an object that is an array attribute or a nested object attribute. The configuration capture component performs a hash type conversion to convert nested object attributes into flattened data. The configuration capture component performs an array type conversion to convert nested array attributes into flattened data. The flattened data is stored or imported in a set of flattened data files. An expansion component converts the flattened data files back into the complex structure attributes without losing or corrupting the complex structure data.

20 Claims, 16 Drawing Sheets

(56) References Cited

U.S. PATENT DOCUMENTS

| | | | | |
|---|---|---|---|---|
| 2011/0225154 A1* | 9/2011 | Isaacson | ............ | G06F 17/30598 |
| | | | | 707/737 |
| 2012/0089562 A1* | 4/2012 | Deremigio | ........ | G06F 17/30563 |
| | | | | 707/602 |
| 2012/0265726 A1* | 10/2012 | Padmanabhan | ....... | G06F 17/303 |
| | | | | 707/602 |
| 2012/0310899 A1* | 12/2012 | Wasserman | ....... | G06F 17/30569 |
| | | | | 707/687 |
| 2013/0185624 A1* | 7/2013 | Appleyard | ............. | G06Q 10/10 |
| | | | | 715/234 |
| 2014/0214753 A1* | 7/2014 | Guerra | .............. | G06F 17/30563 |
| | | | | 707/602 |
| 2014/0274022 A1* | 9/2014 | Bell | .................... | G06Q 30/0282 |
| | | | | 455/418 |
| 2014/0278086 A1* | 9/2014 | San Filippo | ........ | G01C 21/3423 |
| | | | | 701/527 |
| 2014/0337277 A1* | 11/2014 | Asenjo | ................... | G06Q 10/06 |
| | | | | 707/603 |
| 2014/0337472 A1* | 11/2014 | Newton | .................. | H04L 67/32 |
| | | | | 709/217 |
| 2015/0019284 A1* | 1/2015 | Kwan | ............. | G06Q 10/06316 |
| | | | | 705/7.26 |
| 2015/0073967 A1* | 3/2015 | Katsuyama | ............ | G06Q 40/04 |
| | | | | 705/37 |
| 2015/0172321 A1* | 6/2015 | Kirti | ....................... | H04L 63/20 |
| | | | | 726/1 |

* cited by examiner

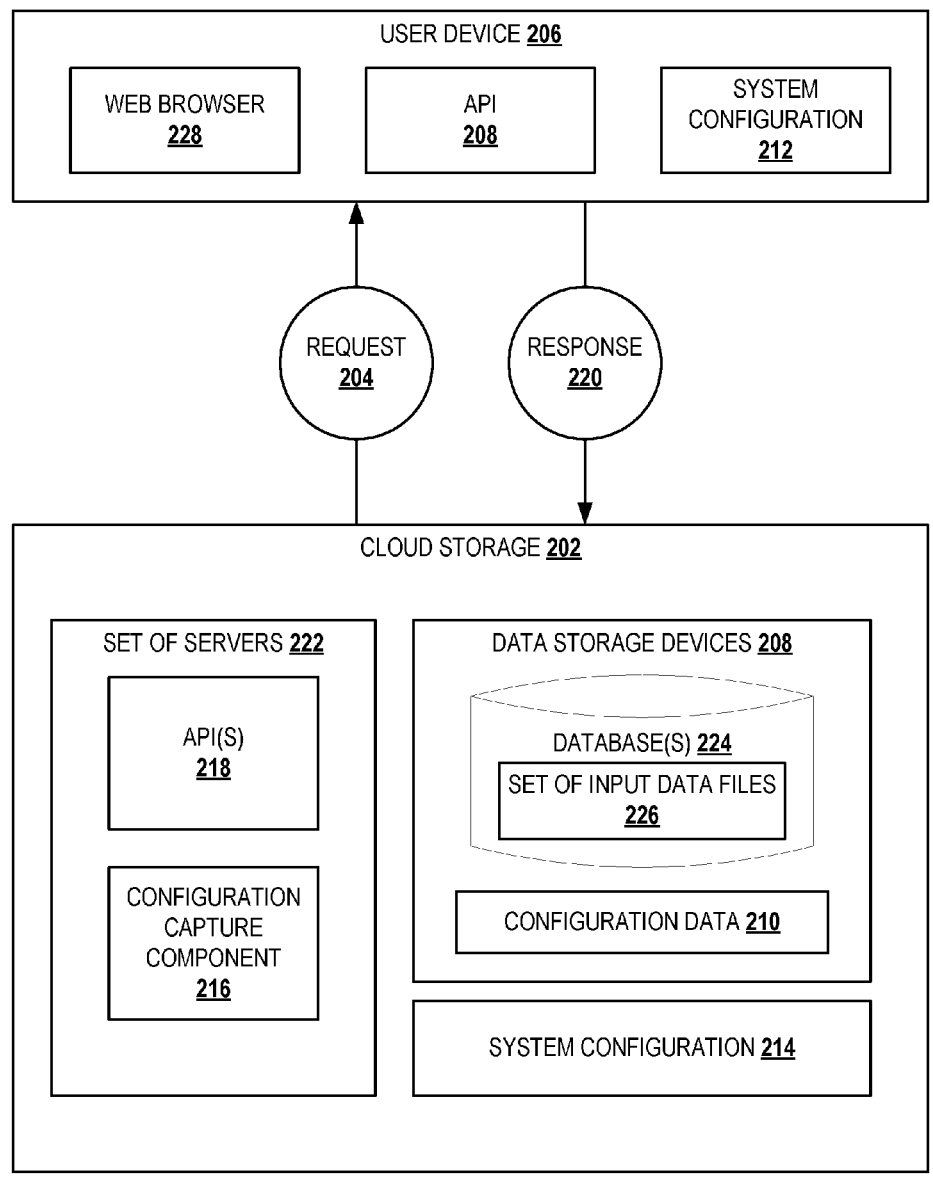

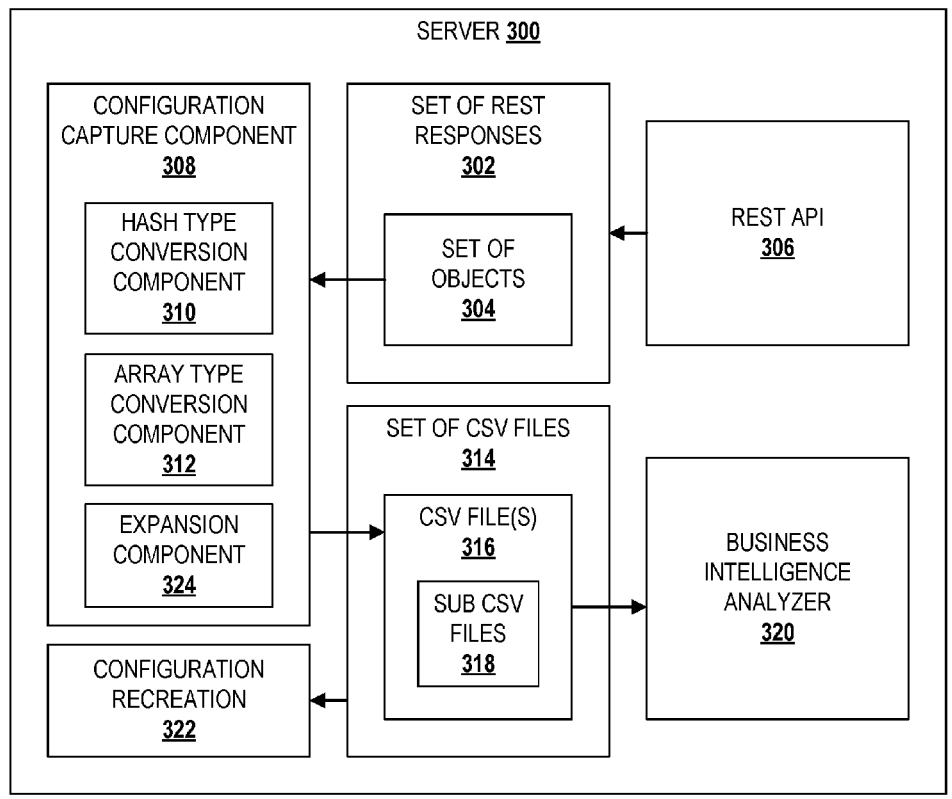
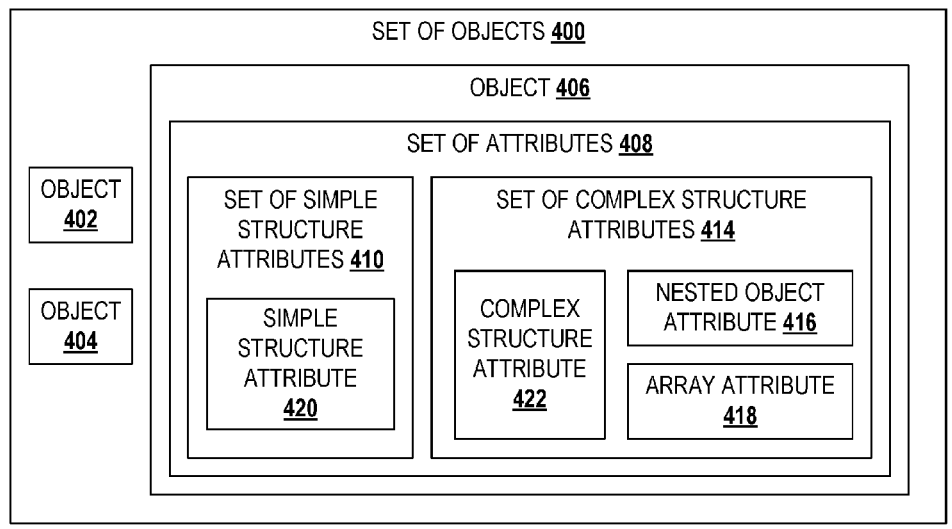

{
             ┌   "addresses":
             │   [
             │           "1.1.1.1",
        902  ┤           "2.2.2.2",
             │           "3.3.3.3"
             │   ],
             └
        904 ──── "domain": "testdns1",
             ┌   "nasServer":
             │   {
        906  ┤           "id": "nas_2"
             │   },
             └
        908 ──── "id": "dns_1"
        }
```

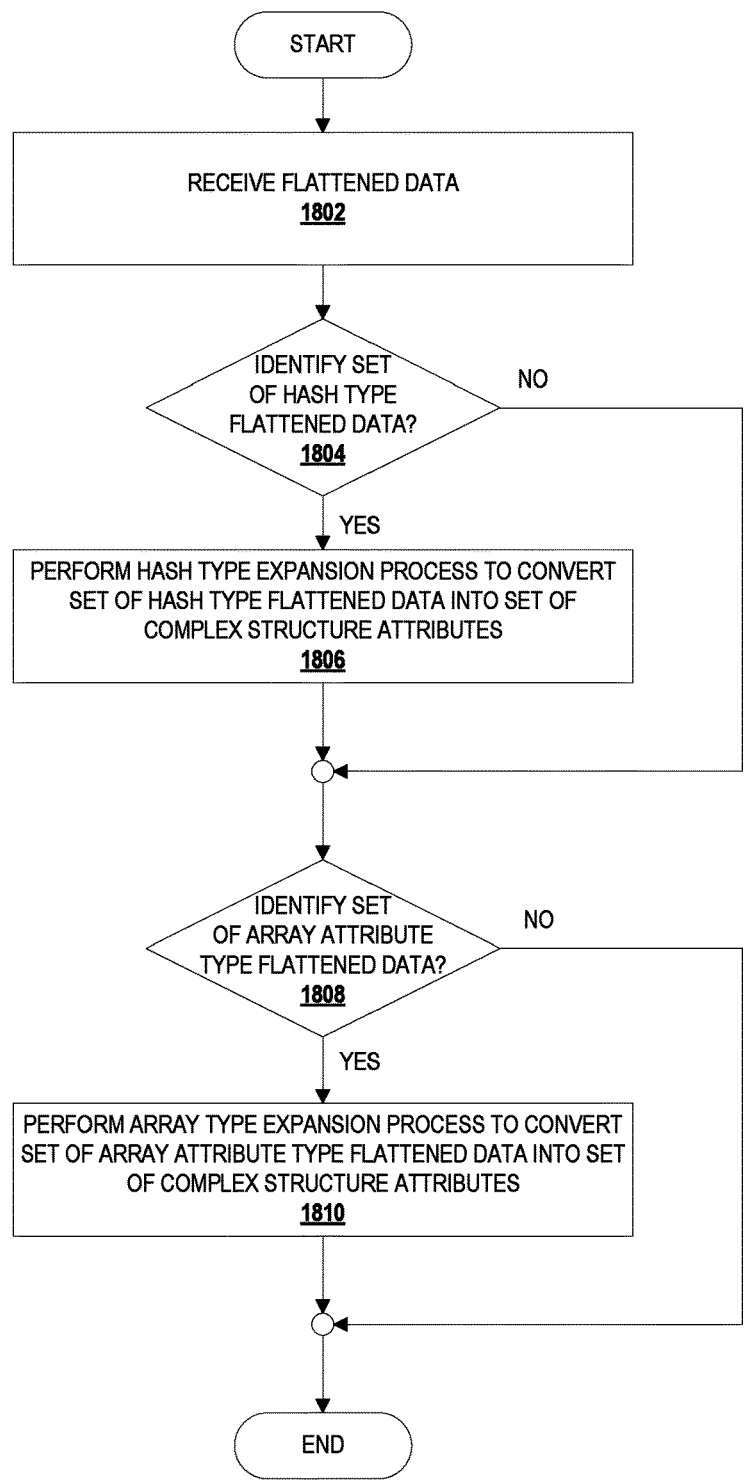

CONVERTING COMPLEX STRUCTURE OBJECTS INTO FLATTENED DATA

BACKGROUND

A representational state transfer (REST) object is an object having one or more attributes. An attribute is a name and value pair. The value may be a simple structure attribute, such as, a string, number, Boolean value, or null. For example, a simple structure attribute may include the attribute name "id" and the simple string value "pool_6". However, a value of a complex structure attribute may be a nested array or a nested object. An array is an ordered collection of values. An object is an unordered set of name and value pairs. A nested array may include another nested array and/or a nested object as a sub-attribute of the nested array. Likewise, a nested object may itself include another nested object or a nested array as a sub-attribute of the nested object. In other words, nested objects and nested arrays are attributes that include one or more other attributes embedded within them.

Simple structure attributes are easily mapped into a flat data file, such as a comma separated value (CSV) file. However, mapping components frequently are unable to handle complex structure attributes. In such cases, the arrays and nested objects are simply ignored, resulting in lost data and inaccurate results. In other cases, array attributes are handled by expanding the values in the array to several rows and copying the values of other attributes into the new rows as well. This approach results in CSV files that rapidly grow in size when the array length is larger or the object has many other attributes. The extremely large file sizes which result are unmanageable and impractical. Moreover, scalability is poor in cases involving more than one attribute of array type in the object. The nested hierarchy typically makes it impractical or impossible to accurately map complex structure attributes in a flatten manner without data loss, data corruption, or unmanageably large data files.

SUMMARY

Examples of the disclosure provide for converting complex structure attributes into flattened data. In an example, a configuration capture component analyzes configuration data associated with a first computing device. The configuration data includes a set of objects. The configuration capture component maps a set of simple structure attributes into a set of flattened data files on identifying the set of simple structure attributes associated with the set of objects. On condition of identifying a set of complex structure attributes associated with the set of objects, the configuration capture component converts the set of complex structure attributes to flattened attribute data. The set of complex structure attributes comprises a set of nested objects and a set of array attributes. The configuration capture component performs a hash type conversion on the set of nested object attributes. The configuration capture component performs an array type conversion on the set of array attributes to generate the flattened attribute data. The configuration capture component maps the flattened attribute data to the set of flattened data files to create a snapshot of a system configuration of the first computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is an exemplary block diagram illustrating a user device associated with a cloud storage system.

FIG. 3 is an exemplary block diagram illustrating a server.

FIG. 4 is a block diagram of a set of objects.

FIG. 9 is an exemplary block diagram illustrating a nested array sub-attribute within an object attribute.

FIG. 18 is an exemplary flowchart illustrating expanding the flattened data files into complex structure attributes associated with a set of objects.

Corresponding reference characters indicate corresponding parts throughout the drawings.

DETAILED DESCRIPTION

Figure 1:
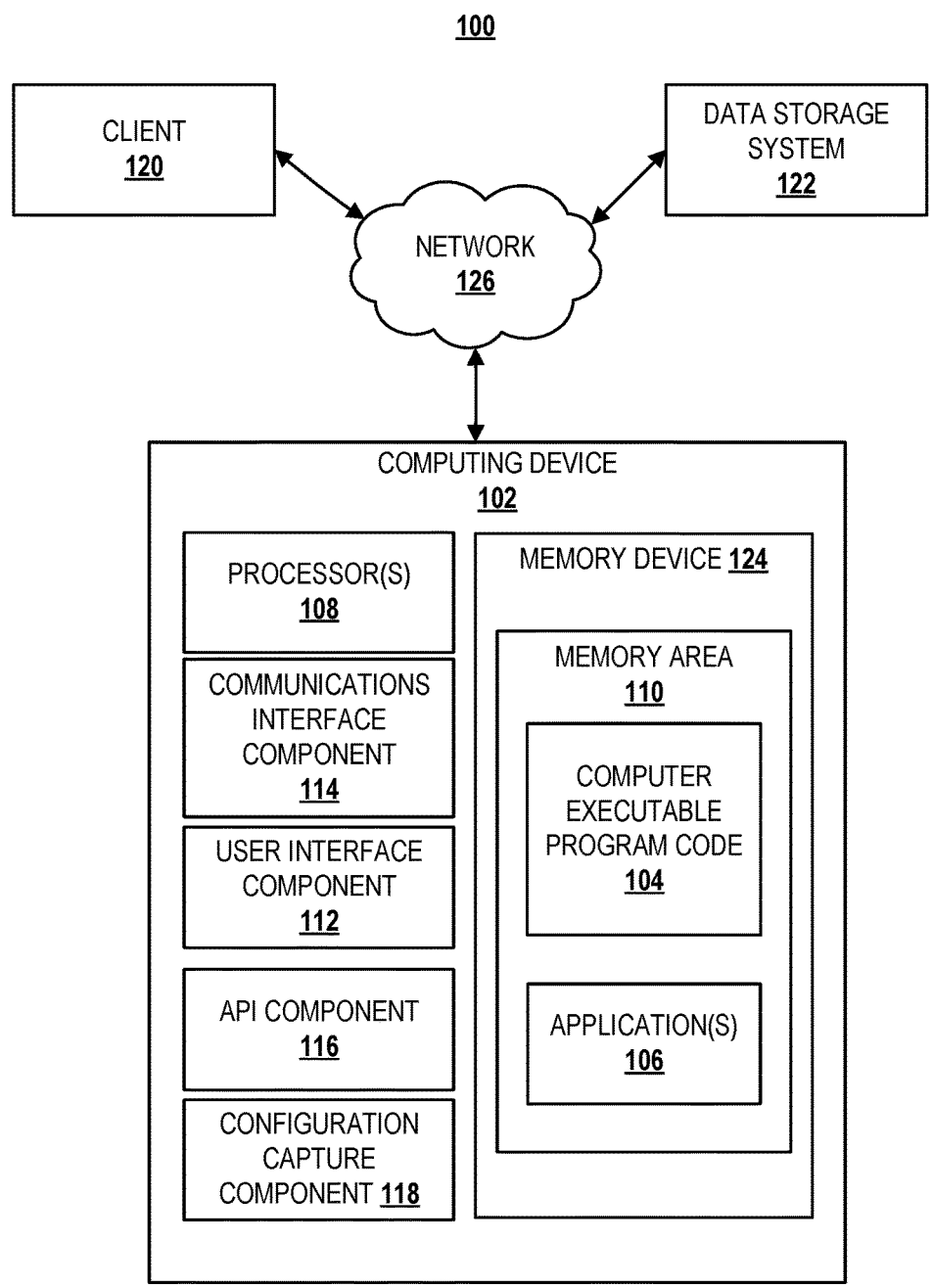
FIG. 1 is an exemplary block diagram illustrating a system for flattening complex structure attributes for configuration capture.

Some aspects of the disclosure provide a configuration capture component that creates a snapshot of a current system configuration of a computing device. The configuration capture component receives configuration data from a computing device. The configuration data includes a set of objects. The objects include one or more complex structure attributes. The configuration capture component flattens the configuration data into a set of flattened data files to create a snapshot of the configuration of the computing device.

In some examples, the configuration capture component is capable of flattening both nested object attributes and nested array attributes that include one or more nested object sub-attributes and/or nested array sub-attributes in a recursive manner such that no information is lost during the configuration capture flatten data process. This improves overall data accuracy, processing speed, and memory usage.

In some examples, a hash type conversion component enables conversion of nested objects into flattened data without data loss in a space efficient manner. The hash type conversion does not introduce extra space to save the attribute of a nested object to a database or other data storage. This enables improved speed and decreased memory usage.

In other examples, an array type conversion component flattens array attributes using a first level flattened data file and a second level flattened data file. The array type conversion adds one extra column into the first level flattened data file to save an array key identifying the nested array. A first level flattened data file may be, without limitation, a comma separated value (CSV) file. The second level flattened data file, or sub-CSV file storing the nested array values, does not require extra space. These flattened data files enable smaller file size for the complex structure attributes in the database or other data storage which consumes less memory.

In other examples, the flattened data is sent to one or more other computing devices or stored in data storage, such as a database or other data structure. The flattened data is easily imported, transmitted, or stored. Converting complex structure attributes into flattened data for storing the data conserves system memory because the flattened data requires less storage space. Converting the complex structure attributes to flattened data prior to transmission also increases data transmission speed and reduces network bandwidth usage when sending the flattened data to another computing device.

Other aspects provide an expansion component for converting the flattened data files back into complex structure attributes and simple structure attributes. The expansion component converts flattened data back to key-value pairs for computation on the values in a simple, efficient, and accurate manner that does not result in lost data. This process of expanding flattened data back into complex structure attributes for analysis further improves accuracy of the expanded complex structure attributes during the conversion process by accurately identifying each complex structure attribute and the corresponding set of values without errors, data loss, or data corruption.

Referring again to FIG. 1, an exemplary block diagram illustrates a system for flattening complex structure attributes into flattened data. In the example of FIG. 1, the data processing system 100 represents a system for flattening complex structure objects for configuration capture. In this non-limiting example, system 100 includes a server-client network. However, the aspects of the disclosure are not limited to networked systems.

A computing device 102 is a device executing computer executable program code 104 (e.g., as application(s) 106, operating system functionality, or both) to implement the operations and functionality associated with the computing device 102. The computer executable program code 104 may also be referred to as computer executable instructions.

In this example, the computing device 102 is a type of computing device for capturing a configuration of another computer system. In some examples, the computing device 102 may include a web server, an application server, a file server, a back-end server, a cloud server, or any other type of server. In other examples, the computing device 102 is a server associated with a data storage system. In still other examples, the computing device 102 may represent a group of processing units or other computing devices.

In this example, the computing device 102 includes one or more processor(s) 108, a memory area 110 associated with a memory device 124, and at least one user interface component 112. The processor(s) 108 includes any quantity of processing units, and is programmed to execute computer-executable program code 104 for implementing the configuration capture component 118. The computer-executable program code 104 may be performed by the processor(s) 108 or by multiple processors within the computing device 102, or performed by a processor external to the computing device 102. In some examples, the processor(s) 108 is programmed to execute computer-executable program code 104 such as those illustrated in the figures (e.g., FIG. 13, FIG. 14, FIG. 15, FIG. 16, FIG. 17, and FIG. 18).

In some examples, the processor(s) 108 represents an implementation of analog techniques to perform the operations described herein. For example, the operations may be performed by an analog computing device and/or a digital computing device.

The computing device 102, in some examples, further includes one or more computer readable media, such as the memory area 110. The memory area 110 includes any quantity of media associated with or accessible by the computing device 102. The memory area 110 may be internal to the computing device 102 (as shown in FIG. 1), external to the server (not shown), or both (not shown). In some examples, the memory area 110 includes read-only memory (ROM) and/or memory wired into an analog computing device.

The memory area 110 stores, among other data, the computer executable program code 104 and the one or more application(s) 106. The application(s) 106, when executed by the processor(s) 108, operate to perform functionality on the computing device 102. Exemplary application(s) 106 include, without limitation, mail server application programs, web services, address book services, messaging services, media services, location-based services, search programs, and the like. The applications may communicate with counterpart applications or services such as web services accessible via a network 126. For example, the applications may represent server-side applications executing in a cloud that corresponds to downloaded client-side services.

The memory area 110 further stores one or more computer-executable components. Exemplary components include a communications interface component 114, an application programming interface (API) 116, and a configuration capture component 118.

In some examples, the communications interface component 114 includes a network interface card and/or computer-executable program code (e.g., a driver) for operating the network interface card. Communication between the computing device 102 and other devices, such as client 120 and data storage system 122, may occur using any protocol or mechanism over any wired or wireless connection. In some examples, the communications interface component 114 is operable with short range communication technologies, such as by using near-field communication (NFC) tags.

In other examples, the user interface component 112 includes a graphics card for displaying data to the user and receiving data from the user. The user interface component 112 may also include computer-executable program code (e.g., a driver) for operating the graphics card. The computer-executable program code may be referred to as computer-executable instructions. Further, the user interface component 112 may include a display (e.g., a touch screen display or natural user interface) and/or computer-executable program code (e.g., a driver) for operating the display. The user interface component 112 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

In some examples, the configuration capture component 118 captures configuration data associated with a current system configuration for a different computer system, such as client 120 or data storage system 122. The configuration data is data describing a current system configuration of the computing system. For example, the configuration data for the data storage system 122 may include an object describing a total size of a pool object, the size used of the pool object, the capacity of the pool object or any other attribute of a data storage system. In this manner, the configuration capture component 118 creates a snapshot of a current system configuration for another system.

The configuration capture component 118 captures configuration data for business intelligence analyzer to help diagnose issues and/or re-create the system configuration on the same computing device or on a different computing device. The input to the configuration capture component is a set of responses including configuration data. As used herein, the term "set" refers to one or more, unless defined otherwise.

The input to the configuration capture component 118 is the configuration data. The configuration data may be received via an API. The API 116, when executed, causes the processor to process API queries and other data from one or more computing devices, such as a client 120 and/or a data storage system 122. The API 116 receives the configuration data from the client 120 and/or the data storage system 122.

In this non-limiting example, the API 116 is a representational state transfer (REST) API. The computing device 102 receives the configuration data via the REST API. The configuration data in this example include a set of REST objects. Each REST object in the set of REST objects is associated with an attribute of the system configuration. However, the examples are not limited to implementation by a REST API.

The output of the configuration capture component 118 is a set of flattened data files which are easily imported into a database for storage or transmitted to one or more other computing devices or systems for analysis or utilization in recreating the system configuration on another client or any other computing device.

However, the examples are not limited to converting only configuration data into flattened data. Other types of data having complex structure attributes may be converted into flattened data. The configuration capture component 118 may convert complex structure attributes associated with any type of data into flattened data and/or flattened data files, such as, without limitation, performance metric, resource allocation data, pool data, or any other type of data associated with complex attribute structures into flattened data. Thus, the configuration capture 118 is capable of capturing the attributes of objects, such as REST objects, with complex structure and mapping that data into flattened data files regardless of the type of data or the information contained within the data.

In this example, the computing device 102 is connected via a network 126 to client 120 and data storage system 122. The network 126 may include any type of network connection. In one example, the network 126 may be the Internet, an intranet, an Ethernet, or other wireless or hardwired connections by which the computing device 102 may send and receive data associated with one or more other computer systems, such as, but without limitation, client 120 and/or data storage system 122. However, other examples do not require a network 126.

Client 120 and data storage system 122 represents any computing device executing instructions (e.g., as application programs, operating system functionality, or both) to implement the operations and functionality associated with the computing device. For example, client 120 may include a mobile computing device or any other portable device. In some examples, a mobile computing device includes a mobile telephone, laptop, tablet, computing pad, netbook, gaming device, and/or portable media player. The client 120 may also include less portable devices such as desktop personal computers, kiosks, tabletop devices, industrial control devices, wireless charging stations, and electric automobile charging stations. Additionally, the client 120 may represent a group of processing units or other computing devices.

In some examples, the client 120 includes one or more processor(s), a memory area, and at least one user interface. The processor includes any quantity of processing units, and is programmed to execute computer-executable program code for implementing aspects of the disclosure. The instructions may be performed by the processor or by multiple processors within the client 120, or performed by a processor external to the client 120.

In another example, the client 120 may include an API (not shown) for sending configuration data to the computing device 102. The API at the client may be a REST API.

Client 120 stores applications in the memory area. The applications, when executed by the processor, operate to perform functionality on the client 120. Exemplary applications include mail application programs, web browsers, calendar application programs, address book application programs, messaging programs, media applications, location-based services, search programs, and the like. The applications may communicate with counterpart applications or services associated with computing device 102, such as web services accessible via the network 126. For example, the applications may represent downloaded client-side applications that correspond to server-side services executing in a cloud.

The data storage system 122 is a system including one or more storage devices. A data storage device may include one or more rotating magnetic storage devices, one or more rotating optical storage devices, and/or one or more solid state drives (SSDs), such as a flash drive. A data storage device may also include a storage array. A data storage array may be, for example, a redundant array of inexpensive disks (RAID) array, an optical storage array, or any other type of data storage array.

The data storage system 122 may also include one or more storage processor(s), one or more port(s), one or more cache(s), memory, network interface card (NIC), one or more pools, one or more fans, and/or one or more data storage devices. A port is a network port, such as, but without limitation, an Ethernet Port or a Fibre Channel (FC) port.

In the example shown in FIG. 1, the system 100 includes a computing device 102, a network 126, client 120, and data storage system 122. In other examples, the system 100 includes a networked server and multiple clients and/or multiple data storage systems not shown in FIG. 1. For example, the computing device 102 may be connected via a network to two or more client computing devices In still other examples, the system 100 may be implemented as a networked data processing system. However, in other examples, the system 100 may not include a network. In these example, the client 120 and computing device 102 may be implemented within a same computing device without a network connection.

Referring now to FIG. 2, an exemplary block diagram illustrating a user device associated with a cloud storage system. In this example, cloud storage 202 is a data storage system optionally including one or more data storage device(s) 208, logical pools, logical units (LUNs), one or more server(s) 222, and any other hardware or software which may be associated with a cloud storage system. The set of servers is a set of one or more servers.

The one or more data storage device(s) 208 includes at least one data storage device. In some examples, the one or more data storage device(s) 208 may include a data storage array. A data storage array includes a plurality of data storage devices. In other examples, the data storage device(s) 208 includes one or more types of data storage devices, such as, for example, one or more rotating disks drives and/or one or more SSDs. In still other examples, the one or more data storage devices 208 include one or more databases 224 for storing data, such as configuration data 210 and set of flattened data files 226.

In some examples, the server generates the request 204 in accordance with one or more APIs 218. In this example, the request 204 is a request in accordance with a REST API.

The one or more servers in the set of servers 222 optionally include a network connection with one or more other computing devices, such as the user device. For example, the one or more servers in the set of servers 222 may send data or receive data via a web browser or other application for sending, receiving, retrieving, or traversing information via a network connection, such as a connection to the Internet, an Ethernet, or any other type of network. In these examples, the request 204 may be sent via an Internet connection or any other type of network connection.

The user device 206 receives the request 204 via API 230. The API in some examples is a REST API. The user device 206 may be any type of device capable of sending and receiving data, such as configuration data, to one or more cloud servers associated with cloud storage 202. For example, the user device 206 may be a desktop computer, a laptop computer, a tablet computer, a smart phone, or any other type of user device.

The user device 206 may access cloud storage 202 resources and services via one or more application(s), such as, but not limited to, a cloud storage gateway, a web-based content management system, or a web browser. The web browser 228 is an application for sending, receiving, retrieving, and traversing data on the World Wide Web (WWW) via a network connection, such as a connection to the Internet. The web browser receives data from one or more other computing devices connected to the Internet. In this example, the web browser 228 may generate and transmit configuration data 210 to cloud storage 202 via a web service API.

In response to the request 204, the user device 206 returns a response 220 including the configuration data 210 describing a current system configuration 212 of the user device 206. In this example, the user device 206 returns the configuration data 210 via the API.

However, the examples are not limited to configuration data 210 associated with the configuration of a user device 206. In other examples, the configuration capture component 216 receives configuration data describing a current configuration of one or more data storage devices, such as data storage device(s) 208 associated with the cloud storage 202. In other words, the configuration capture component 216 may receive configuration data for a computing device or computing system associated with cloud storage 202.

In still other examples, the configuration data 210 may be data describing a system configuration 214 of one or more other servers in the set of servers 222. In these examples, the configuration capture component 216 is a component associated with a first server in the set of servers 222 and the configuration data 210 is data describing a configuration of a second server in the set of servers 222.

In this example, a server in a set of servers 222 associated with cloud storage 202 sends a request 204 to a user device 206 and the user device returns configuration data to the server in response to the request. However, in other examples, the server does not send a request for configuration data to the user device. In these examples, the user device automatically sends the configuration data to the server without receiving any requests from the server.

FIG. 3 is an exemplary block diagram illustrating a server. The server 300 is a computing device for converting complex structure attributes into flattened data files. In some examples, the server 300 receives a set of REST responses 302 including a set of object 304 via a REST API 306. In this example, the set of REST responses 302 provides system configuration data to the configuration capture component for conversion into a set of flattened data files.

The set of objects 304 is a set of one or more objects including at least one complex structure attribute, such as, but not limited to, object(s) including an array attribute, a nested object attribute, and/or a nested array sub-attribute. Each object in the set of objects 304 includes a set of attributes.

In some examples, the set of objects 304 includes object(s) in a JAVASCRIPT object notation (JSON) format. However, the examples are not limited to objects in JSON format. The set of object 304 may include extensible markup language (XML) objects or any other type of objects that include complex structure attributes, such as array attributes, nested objects, and/or nested arrays attributes.

The configuration capture component 308 consumes the data received via the REST API and outputs the flattened data files. In some examples, the set of flattened data files include any type of delimited output file. The delimited output includes, without limitation, comma delimited data, pipe delimited data, colon delimited data, semi-colon delimited data, or tab delimited data. In these examples, the flattened data files may include, without limitation, comma-separated value (CSV) file(s), pipe separated value file(s), semi-colon separated value file(s), tab separated value file(s), or any other type of file containing flattened data or otherwise associated with flattened data.

In some examples, the configuration capture component 308 converts the set of objects 304 into a set of one or more flattened data files, such as set of CSV files 314. The configuration capture component 308 includes a hash type conversion component 310 and an array type conversion component 312. The hash type conversion component 310 performs a hash type conversion process on complex structure attributes to flatten array attributes.

An attribute of an object is called a hash attribute when it has one or more sub-attributes. The REST response of such attribute is structured as:

```
"content" :{ ...
    hash_attribute: {
        sub-attribute-1: value_1
        sub-attribute-2: value_2
        sub-attribute-3: value_3 ... }}.
```

The hash type conversion component 310 expands the sub-attributes of a nested object into several simple sub-attributes in the same row. The sub-attributes are expanded in the same way as other attributes. There is no extra flag to indicate whether an attribute is a sub-attribute. The name of the sub-attribute is concatenated to the original higher level object name and the sub-attribute name. The format for the concatenated name is:

hash-attribute-name_sub-attribute-name.

This concatenated sub-attribute name and value are then mapped to the flattened data file.

The array type conversion component 312 performs an array type conversion process on array attributes to flatten the attributes for conversion to one or more flatten data files. An array attribute may include a single array as well as one or more nested arrays within the array attribute. In other words, a sub-attribute of an array may be another object or another array. Likewise, the sub-attribute of a sub-attribute array may be another array.

The array type conversion component 312 expands the array to multiple simple sub-attributes in the same row. The length of the array varies for different instances. The array type conversion component outputs the contents of the array into a separate file. The array type conversion component 312 generates a key as the identifier of the array in the flattened data file and creates a second level flattened data file to hold the actual values of the array. The array in some examples includes a plurality of values. The key is assigned to the array attribute and included in the first level flattened data file and the second level flattened data file.

In this example, the handling of the nested array attribute is not specified to the structure of the attribute or the depth of the nested layers. At each nested layer, the attributes are iterated and handled depending on the type of the attribute, such as array, hash, or simple structure (string, numeric, Boolean, date, null, etc.).

The configuration capture component 308 uses a recursive approach so it can handle nested cases regardless of how complex the nested objects and nested arrays. If a sub-attribute element of an array is a hash, the hash type conversion component processes that sub-attribute element recursively. If the sub-attribute element of a hash attribute is an array, the array type conversion component 312 processes it recursively.

In this example, the set of flattened data files is a set of comma separated value (CSV) files 314. However, the examples are not limited to CSV files. In other examples, the flattened data files may include any type of delimited data files for holding simple structure attributes and flattened complex structure attributes. For example, instead of a comma separated value file, the flattened data files may include semicolon separated values, or any other type of delimiters.

The set of CSV files includes one or more CSV files, such as CSV file 316. In some examples, the configuration capture component creates one CSV files for each object. The configuration capture component maps the attributes of a given object into columns of the CSV file 316. The set of CSV files may also include sub-CSV files 318 holding a set of values of an array. A sub-CSV file is a second level flattened data file.

The set of CSV files 314 may be sent to an analysis engine, such as, but not limited to a business intelligence analyzer 320. The flattened data files are easily imported into the business intelligence analyzer, a performance analyzer, or other systems for analysis of the flattened data. For example, the business intelligence analyzer in some examples converts the flattened data files back into the complex structure attributes for analysis inside a big data environment.

In other examples, the set of CSV files 314 may be sent to a configuration recreation 322 component. The configuration recreation 322 component utilizes the set of flattened data files to recreate a system configuration of a computing device. The configuration recreation 322 component recreates the system configuration. The configuration recreation 322 component may recreate the system configuration of a first computing device on a different second computing device, recreate the system configuration on two or more different computing devices, recreate the first computing device configuration on the same first computing device, or recreate the system configuration on any other computing device.

The configuration capture component 308 optionally includes an expansion component 324. The expansion component 324 converts a set of flattened data files, such as CSV files 314, into a set of objects having a set of complex structure attributes. In other words, the expansion component 324 analyzes the flattened data provided within flattened data files and converts the flattened data back into the complex structure attributes.

In other words, in this non-limiting example, the configuration capture component analyzes configuration data describing a configuration of a client or other computing device. The configuration data includes a set of objects associated with a set of complex structure attributes. A complex structure attribute is an attribute of an object that is an array attribute or a nested object attribute. The configuration capture component performs a hash type conversion to convert nested object attributes into flattened data. The configuration capture component performs an array type conversion to convert nested array attributes into flattened data. The flattened data is stored in a set of flattened data files. The set of flattened data files create a snapshot of a system configuration of the client. The system configuration in this example is a current system configuration. However, the set of flattened data files in other examples includes a snapshot of a past or previous system configuration of the client.

In some examples, the set of flattened data files is stored in a database or other data storage. In other examples, the set of flattened data files is imported to one or more other computing devices. The one or more other computing devices receiving the set of flattened data files optionally expands the set of flattened data files back into the original configuration data, including the set of objects associated with the set of complex structure attributes without losing data.

In some non-limiting examples, the set of flattened data files creates a snapshot of a system configuration associated with a first computing device. The configuration capture component receives the set of flattened data files from a cloud or other storage device via an Internet connection. The expansion component 324 converts the flattened data files back into the original set of objects including the complex structure attributes to recreate the original system configuration data.

In some examples, the system configuration snapshot is used to recreate the configuration of the first computing device on a second computing device. In other examples, the system configuration snapshot is used to analyze the configuration of the first computing device to troubleshoot or otherwise diagnose issues associated with the first computing device.

At least a portion of the functionality of the various elements in FIG. 1, FIG. 2, and FIG. 3 may be performed by other elements in FIG. 1, FIG. 2, and FIG. 3, or an entity (e.g., processor, web service, server, application program, computing device, etc.) not shown in FIG. 1, FIG. 2, and FIG. 3.

FIG. 4 is a block diagram of a set of objects. The set of objects 400 is a set of one or more objects, such as object 402, object 404, and object 406. The set of objects 400 in this example includes three (3) objects. However, in other examples, the set of objects 400 may include a single object, two objects, as well as four or more objects.

In this example, the object 406 is an object representing a REST object describing an attribute of a system configuration. The object 406 may be a JSON object, an XML object, or any other type of object including a set of complex structure attributes.

The set of attributes 408 is a set of one or more attributes. An attribute may be a simple structure attribute 420 or a complex structure attribute 422. The set of simple structure attributes 410 is a set of zero or more simple structure attributes. In other words, the set of simple structure attributes 410 may be an empty set having no simple structure attributes, as well as a set including one or more simple structure attributes.

A simple structure attribute 420 is an object having an unordered name and value pair without any nested objects or arrays. The name and value pair is a name of a sub-attribute and a value of the sub-attribute. A simple structure attribute may include a simple string, number, Boolean value, or null.

The set of complex structure attributes 414 includes one or more complex structure attributes. A complex structure attribute 422 may be nested object attribute 416 or array attribute 418.

Figure 5:
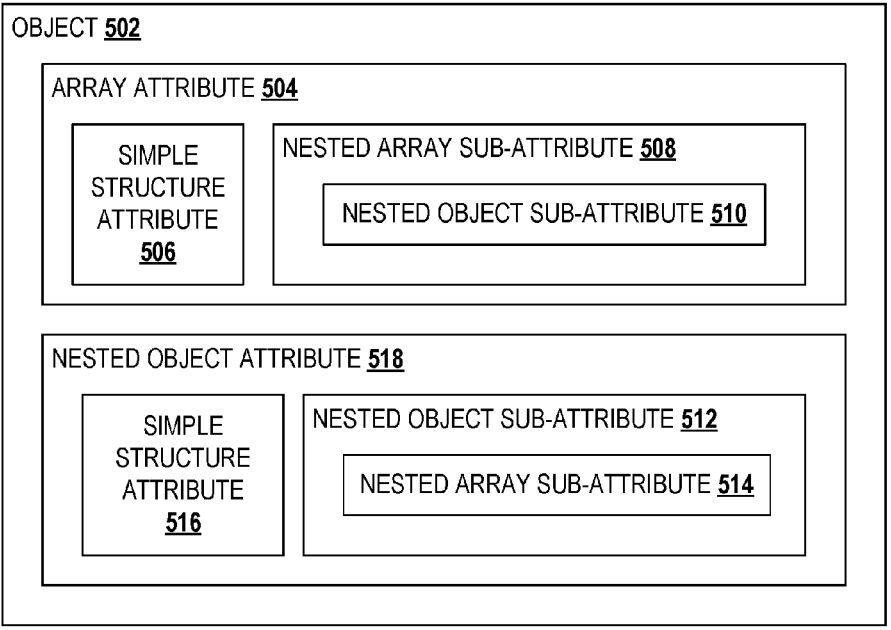
FIG. 5 is a block diagram of an object including a nested object and an array attribute.

FIG. 5 is a block diagram of an object including a nested object and an array attribute. The object 502 is an object including complex structure attributes. For example, the object 502 includes an array attribute 504. The array attribute includes a name and a set of sub-attributes. One of the sub-attributes in this example is a simple structure attribute 506. A simple structure attribute may be mapped directly into a flattened data file without processing.

Another sub-attribute in this example is a nested array sub-attribute 508. A nested array sub-attribute is an array value that is itself another nested array. In this example, the nested array sub-attribute includes a nested object sub-attribute 510. In other words, the nested array sub-attribute is a nested object that includes one or more sub-attributes. However, a nested array sub-attribute is not limited to a single nested object sub-attribute. In other examples, the nested array sub-attribute 508 consists of one or more nested object sub-attribute(s), nested array sub-attribute(s), and/or simple structure attribute(s). Likewise, the nested object sub-attribute 510 may itself include one or more nested object sub-attributes, simple structure sub-attributes, and/or nested array sub-attributes.

The object 502 may include an object attribute 518 that includes a simple structure attribute 516 and a nested object sub-attribute 512. The nested object sub-attribute 512 in this example includes a nested array sub-attribute 514. However, the examples are not limited to a nested object sub-attribute that includes a single nested array sub-attribute. In other examples, a nested object sub-attribute may include one or more nested object sub-attribute(s), nested array sub-attribute(s), and/or simple structure attribute(s).

The configuration capture recursively processes every attribute in a set of attributes associated with the top level object 502 until every attribute is converted to the flattened data. The term "recursively" refers to the process or part of the process that repeats itself in which the output of one successive execution of the process or part of the process is input to the next successive execution. The output of one iterative execution of one or more operations becomes the input to a next iterative execution of the same one or more operations.

Figure 6:
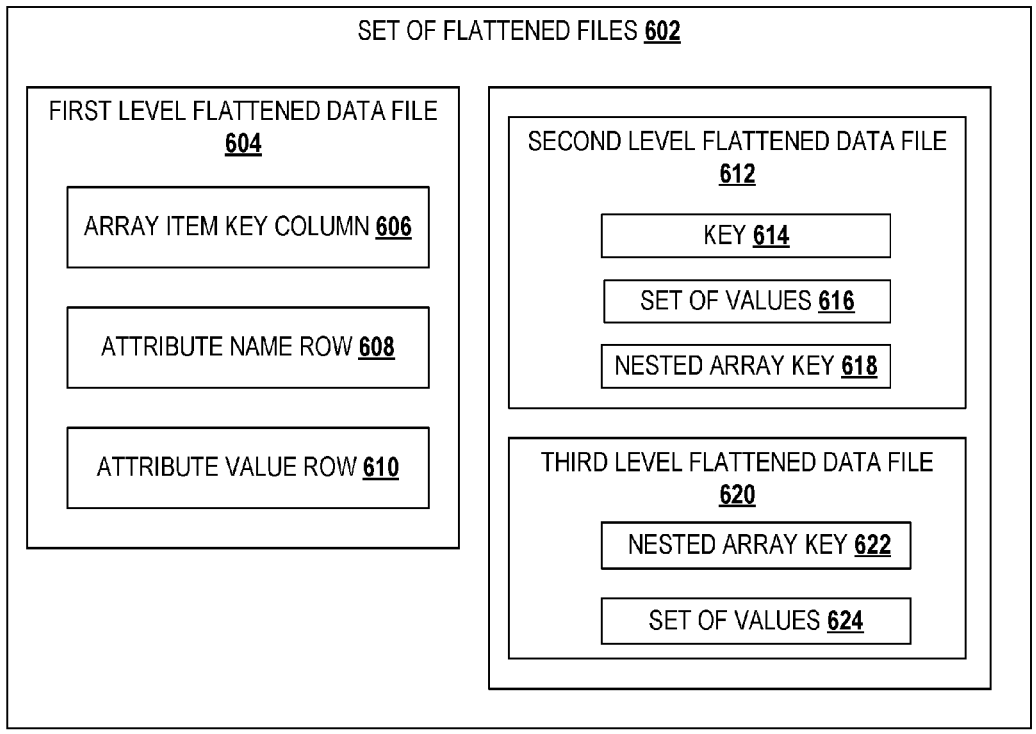
FIG. 6 is a block diagram of a set of flattened data files.

FIG. 6 is a block diagram of a set of flattened data files. The set of flattened data files 602 is a set of one or more flattened data files. A first level flattened data file 604 is a file representing an array attribute, such as array attribute 504 in FIG. 5 above. In this example, the first level flattened data file 604 includes an array item key column 606 holding a key 614 identifying the array attribute. The attribute name row 608 includes a name of the array attribute. The attribute value row 610 includes one or more sub-attribute values corresponding to the array attribute.

The second level flattened data file 612 is a sub-file for holding a set of values 616 for the attribute array. In some examples, the second level flattened data file 612 is a sub-CSV file.

The set of values 616 includes all the simple structure sub-attribute values of the array attribute 504. In this example, one of the sub-attributes of the upper-level attribute array is a nested array sub-attribute, such as nested array sub-attribute 508 in FIG. 5. The nested array sub-attribute may be referred to as a second level nested array of the higher-level array attribute. The second level flattened data file 612 includes a key 614 representing the upper-level array attribute and a nested array key identifying the lower-level, nested array sub-attribute. The nested array key 618 may be referred to as a sub-key.

The third level flattened data file 620 is a data file for storing the values of the nested array sub-attribute. The third level flattened data file 620 includes the set of values 624 for the second-level nested array and the nested array key 622 identifying the second-level nested array.

Figure 7:
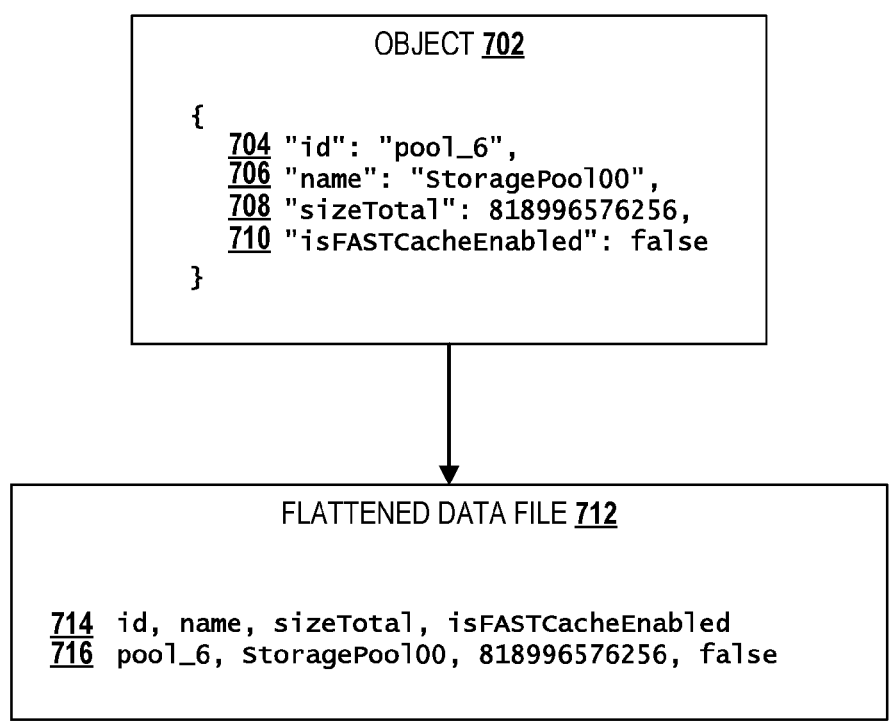
FIG. 7 is an exemplary block diagram illustrating mapping of a simple structure object into a flattened data file.

FIG. 7 is an exemplary block diagram illustrating mapping of a simple structure object into a flattened data file. The simple structure object 702 includes a set of simple name/value pair attributes, such as attributes 704, 706, 708, and 710. In this example, the sub-attribute 704 having name "id" corresponds to the simple string value "pool_6". Simple structure attributes like this are mapped directly to the flattened data format without performing a hash type conversion or an array type conversion. The configuration capture component maps the name of each sub-attribute to the attribute name row 714 of the flattened data file 712 and maps the corresponding sub-attribute value to an attribute value row 716 in the flattened data file 712.

In this example, the attribute name "id" of attribute 704 and the attribute name "name" of attribute 706 is mapped into the attribute name row 714. The value "pool_6" of attribute 704 and the value "storagepool100" of attribute 706 are mapped into the attribute value row 714. The name "sizeTotal" is mapped into the attribute name row 714. The number value 818996576256 of attribute 708 is mapped into the attribute value row 716. Likewise, the name "isFAST-CacheEnabled" of attribute 710 is mapped into the attribute name row 714. The Boolean value "false" of attribute 710 is mapped into the attribute value row 716.

Figure 8:
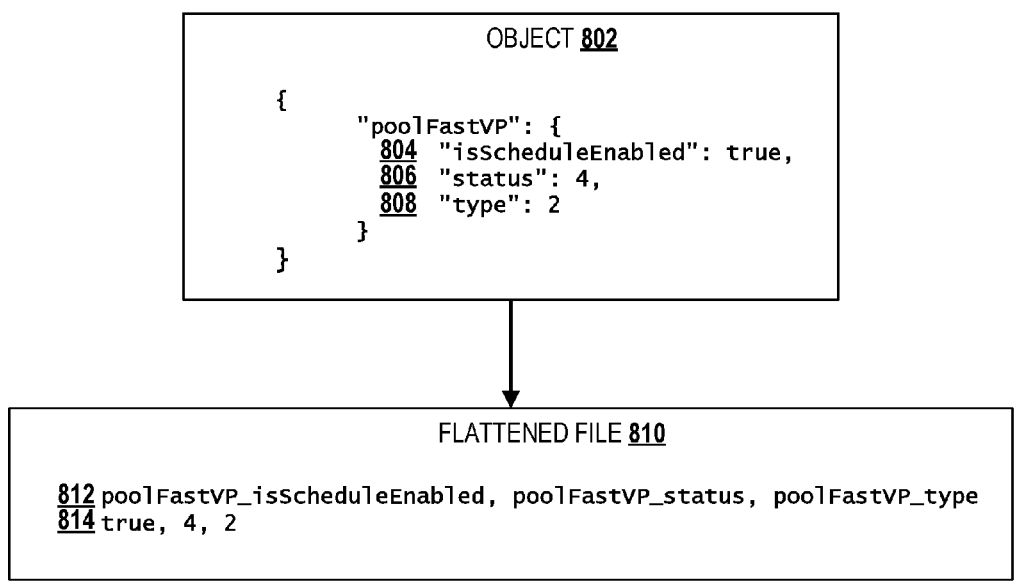
FIG. 8 is an exemplary block diagram illustrating conversion of a complex structure nested object into a flattened data file.

FIG. 8 is an exemplary block diagram illustrating conversion of a complex structure nested object into a flattened data file. The object 802 is an embedded attribute of another higher level object (not shown). The object 802 further includes an embedded type nested object named "poolFastVP" having a set of sub-attributes 804, 806, and 808. The sub-attributes are name and value pairs. In this example, a hash type conversion component concatenates the name of each second-level sub-attribute with the name of the first level attribute "poolFastVP" to form a concatenated sub-attribute name. Each of the concatenated sub-attribute names is added to the attribute name row 812 of the flattened data file. The hash type conversion component adds the value for each sub-attribute to the attribute value row 814 of the flattened data file 810.

For example, the sub-attribute 804 "isScheduleEnabled" is concatenated to the attribute name "poolFastVP" to create the concatenated sub-attribute name "poolFastVP_isScheduleEnabled". This concatenated name is added to the attribute name row 812 and the Boolean value "true" of sub-attribute 804 is added to the attribute value row 814.

Likewise, the sub-attribute 806 name "status" is concatenated to the attribute name "poolFastVP" to form the concatenated name "poolFastVP_status". This concatenated name is added to the attribute name row 812 and the number value "4" associated with sub-attribute 806 is added to the attribute value row 814.

FIG. 9 is a block diagram of a nested array sub-attribute within an object attribute. The object 900 in this example is an object that includes a set of sub-attributes. The sub-attributes include a nested array sub-attribute 902 named "addresses", a simple structure attribute 904, a nested object sub-attribute 906, and a simple structure attribute 908.

The nested array sub-attribute 902 includes three array values "1.1.1.1", "2.2.2.2", and "3.3.3.3." The configuration capture component creates a first level flattened data file to hold the name of the "addresses" array and a second level flattened data file to hold the set of attribute values of the "addresses" array.

Figure 10:
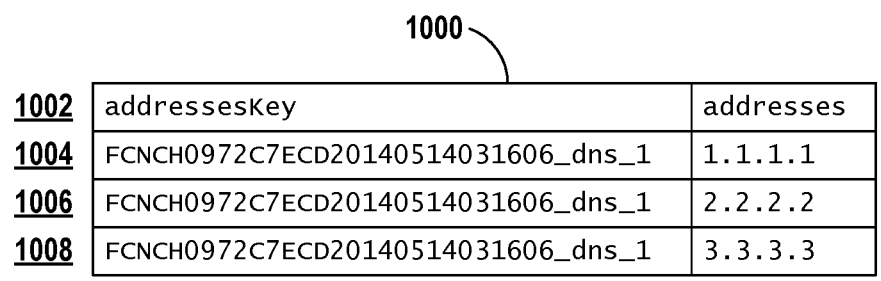
FIG. 10 is an exemplary block diagram illustrating a sub-comma separated value (CSV) file corresponding to a nested array sub-attribute.

FIG. 10 is a block diagram of a sub-CSV file corresponding to the nested array sub-attribute. The sub-CSV file 1000 is a second level flattened data file holding the values of the nested array sub-attribute 902 shown in FIG. 9 above. The content of the nested array sub-attribute 902 is output to the separate sub-CSV file 1000.

In one example, the name format of the array output to the sub-CSV file is:

<yyyymmdd>_<hhmmss>_<serial number>_<Output file name from ini>_<key of the array>_sub.csv.

For example, a sub_csv file name may be:
2014014_031606_FCNCH0972C7ECD_fileDNSServer_addresses_sub.csv.

The sub-CSV file 1000 is populated with an array key "addresseskey" 1002 identifying the array named "addresses". The sub-CSV file rows 1004, 1006, and 1008 are further populated by the values associated with the nested array.

Figure 11:
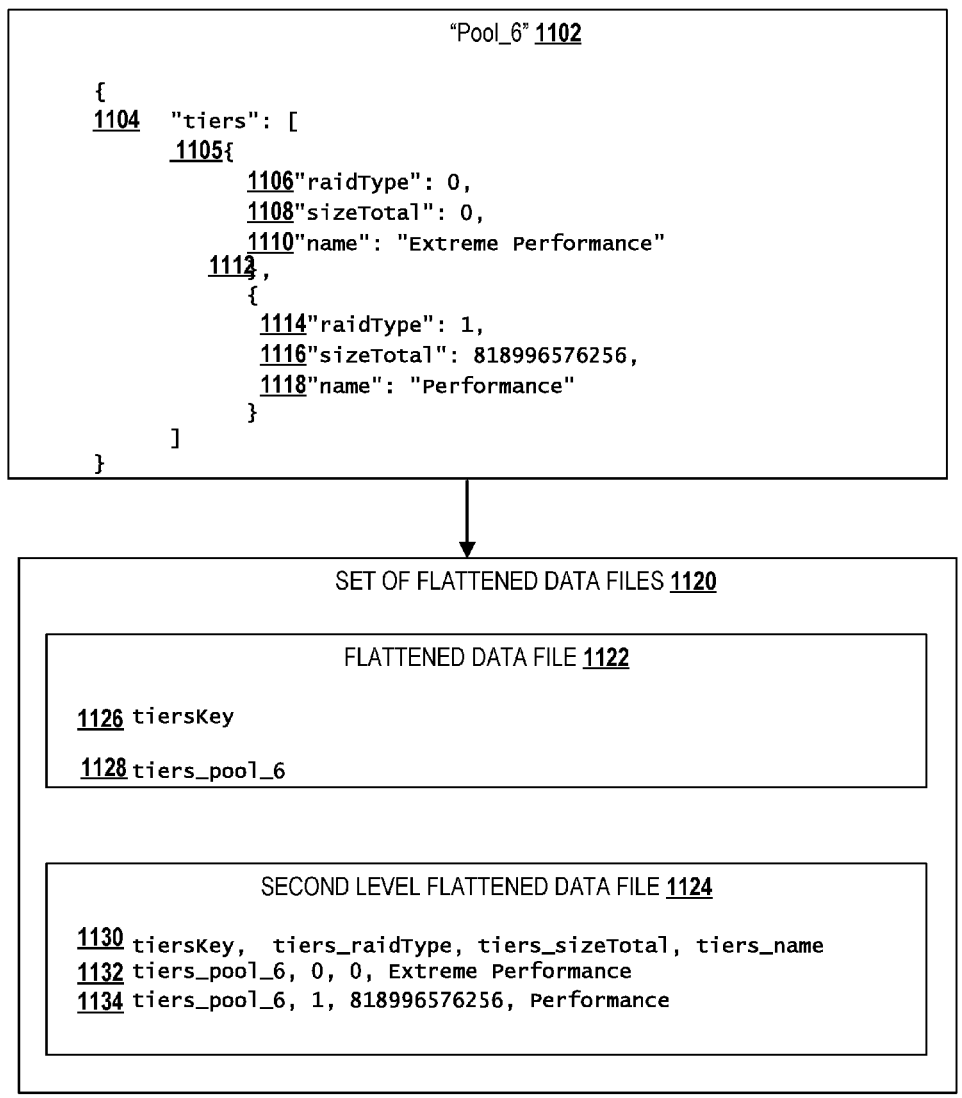
FIG. 11 is an exemplary block diagram illustrating conversion of a complex structure array attribute including two nested object sub-attributes into a set of flattened data files.

FIG. 11 is an exemplary block diagram illustrating conversion of a complex structure array attribute including two nested object sub-attributes into a set of flattened data files. The "tiers" array attribute 1104 is an array type complex structure attribute which is itself a nested array attribute of an upper-level "pool_6" object 1102. The "tiers" array attribute 1104 includes nested object sub-attribute 1105 and nested object sub-attribute 1112. In other words, the higher level "tiers" array attribute 1104 includes two lower level nested array sub-attribute values which are themselves nested objects containing another set of sub-attributes for each of the nested objects.

In this example, the nested object sub-attribute 1105 includes sub-attributes 1106, 1108, and 1110. The second nested object includes sub-attributes 1114, 1116, and 1118. Each of these sub-attributes 1106, 1108, 1110, 1114, 1116, and 1118 are simple structure name and value pair attributes.

The configuration capture component creates a lower level flattened data file or sub-file for each array attribute. The format for the name of a lower level flattened data file is as follows:
<timestamp>_<system>_pool_tiers_sub.csv.

Here, the example shown in FIG. 11, the configuration capture component creates a first level flattened data file 1122 corresponding to the "tiers" array attribute 1104 and a second level flattened data file 1124 corresponding to the sub-attributes of the "tiers" array attribute 1104. The configuration capture component generates a key identifying the "tiers" array attribute 1104.

The hash attributes are expanded in the same lower level flattened data file 1124. The name of the first level "pool_6" object 1102 is concatenated with the name of the lower-level nested array "tiers" to form the concatenated name "tierspool_6" for the nested array. The configuration capture component populates the first level flattened data file 1122 with the concatenated name of the nested object sub-attribute 1105 and the generated key "tiers-key" 1126 identifying the "tiers" array attribute 1104.

The configuration capture component concatenates a name of each sub-attribute with the name of the "tiers" array attribute 1104 to generate a concatenated sub-attribute name for each of the sub-attributes 1106, 1108, 1110, 1114, 1116, and 1118. For example, the nested array name "tiers" is concatenated to the sub-attribute 1106 name "raidtype" to form the concatenated name "tiers_raidtype" which is added to the second level flattened data file 1124.

The configuration capture component populates the first level flattened file 1120 with a concatenated name "tiers_pool_6" 1128 identifying the "tiers" array attribute 1104 of the higher level "pool_6" object 1102. The "tiers-key" 1126 is added to the key column identifying the second level flattened data file 1124 containing the values of the "tiers" array attribute 1104.

The configuration capture component populates the second level flattened data file 1124 with the concatenated sub-attribute names added to an attribute name row 1130. In this example, the attribute name row 1130 includes the concatenated name "tiers_raidtype" indicating the "tiers" array attribute 1104 and the "raidtype" sub-attribute 1106. The concatenated name "tiers_sizeTotal" in the attribute name row 1130 indicates the "tiers" array attribute 1104 and the "sizeTotal" sub-attribute 1108, and so forth.

The second level flattened data file is populated with the values for each sub-attribute. These values are added to an attribute value row 1132 for the first nested object sub-attribute 1105. For example, the number value "0" of the sub-attribute 1106, the number value "0" of the sub-attribute 1108, and the string value "Extreme Performance" of the sub-attribute 1110 are added to the attribute value row 1132 in a same order as the order of the array attribute values embedded within the "tiers" array attribute 1104.

The values of the sub-attributes for the second nested object sub-attribute 1112 are added to another attribute value row 1134. The key identifying the nested array "tiers-key" 1126 is also added to the second level flattened data file.

The first level flattened data file and the second level flattened data file form a set of flattened data files. In some examples, the set of flattened data files is a set of CSV files. In these examples, the first level flattened data file may by a CSV file and the second level flattened data file may be referred to as a sub-CSV file. Where the set of flattened data files are CSV files, the array type conversion component adds a column into the CSV file to hold the key identifying the array. The array type conversion component creates a sub-CSV file is created for each nested array sub-attribute of the upper level "tiers" array attribute 1104.

In this example, the set of flattened data files 1120 includes a single flattened data file 1122 and a single second level flattened data file 1124. However, in other examples, the set of flattened data files includes one or more first level flattened data files, second level flattened data files, third level flattened data files, fourth level flattened data files, and so forth.

For example, the "tiers" array attribute may include an array sub-attribute named "raidGroups" having one or more "disk" attributes. In this example, the set of flattened data files 1120 includes the upper level flattened data file 1122 representing the "tiers" array, the second level flattened data file 1124 holding the values of the "tiers" array, another second level flattened data file representing the "raidGroups" array sub-attribute, and a third level flattened data file representing the values of the "raidGroups" array sub-sub-attribute. The name format of the additional second level flattened data file and the third level flattened data file in this example is as follows:

<timestamp>_<system>_pool_tiers_raidGroups_sub.csv;
<timestamp>_<system>_pool_tiers_raidGroups_disks_sub.csv.

In another example, the tiers attribute may include two array sub-attributes, array sub-attribute "one" and array sub-attribute "two." The array sub-attribute "one" further includes a nested array sub-attribute "three." In this example, the set of CSV files would include an upper level flattened data file containing the "tiers" array attribute, a second level flattened data file representing the values of the "tiers" array, a third level flattened data file containing the values of the array sub-attribute "one", another third level flattened data file containing the values of the array sub-attribute "two", and a fourth flattened data file containing the values of the nested array sub-attribute "three."

Figure 12:
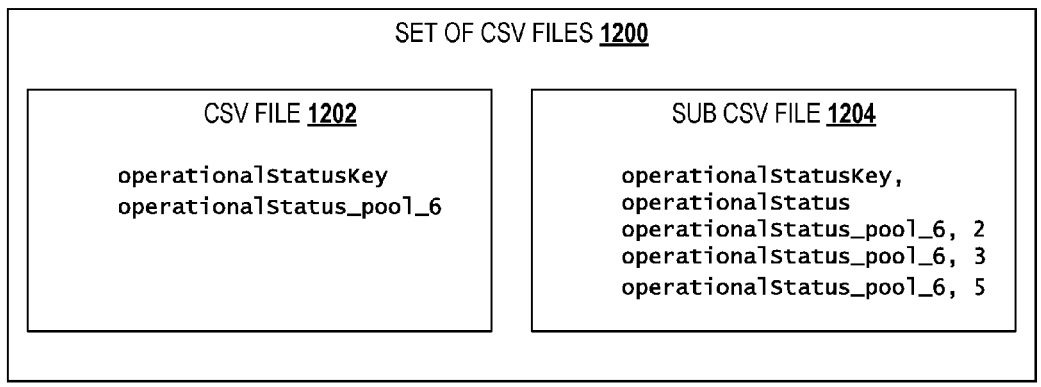
FIG. 12 is an exemplary block diagram illustrating a set of CSV files representing a nested array attribute.

FIG. 12 is a block diagram of a set of CSV files representing a nested array attribute. A set of CSV files 1200 in this example is a set of two or more CSV files associated with a nested array attribute. The set of CSV files 1200 includes CSV file 1202 and sub_CSV file 1204.

In this example, the set of CSV files is sent to a server, client, an analysis engine, or other computing device for analysis. On receiving the set of CSV files, a configuration capture component of the computing device converts the set of CSV files back into a set of complex structure attributes of a set of objects. In other words, the configuration capture component performs a process to convert the flattened data back into the complex structure attributes.

In this example, the nested array named "operationalStatus" is a lower level nested array attribute of an upper level object named "pool_6". As used herein, an upper level object is an object that includes the lower level object as a nested attribute. The first CSV file 1202 is populated with an array key referred to as "operationalStatusKey" and the concatenated name of the nested array, which is "operationalStatus_pool_6.

The second level flattened data file, sub-CSV file 1204 is populated with the array key "operationalStatusKey" identifying the nested array "operationalStatus", a name of the nested array, and a set of values for the nested array. In this example, the set of values includes a concatenated name of each sub-attribute followed by the value for the sub-attribute. For example, sub-attribute "operationalStatus_pool_6 array includes the sub-attribute values "2, 3, and 5".

The configuration capture component expands the flattened data provided in the set of CSV files 1200 into the following:

"operationalStatus": [2, 3, 5],
nested array attribute having a set of three array values. In this manner, the configuration capture component converts complex structure attributes into flattened data and/or expands the flattened data back into the complex structure attributes without data loss.

Figure 13:
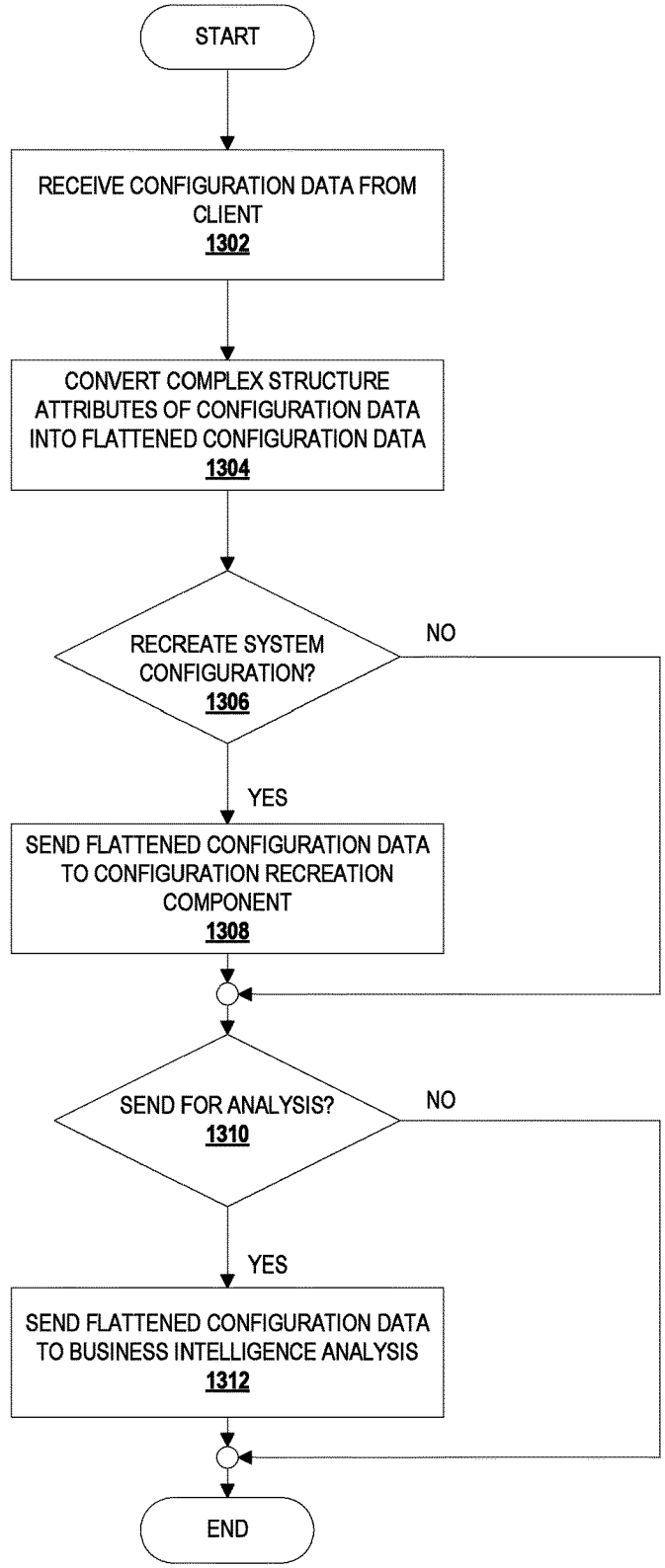
FIG. 13 is an exemplary flowchart illustrating converting a set of objects including complex structure attributes into a set of flattened data files.

FIG. 13 is an exemplary flowchart illustrating operation of the computing device to flatten configuration data for configuration capture. The process shown in FIG. 13 may be implemented by a computing device, such as, but without limitation, computing device 102 in FIG. 1, set of servers 222 in FIG. 2, or server 300 in FIG. 3.

The process begins by receiving configuration data from a client at 1302. The process converts the complex structure attributes of the configuration data into flattened configuration data at 1304. The process determines whether to recreate a system configuration at 1306. If yes, the process sends the flattened configuration data to configuration recreation component at 1308. The process determines whether to send for analysis at 1310. If yes, the flattened data is sent to a business intelligence analyzer at 1310 with the process terminating thereafter.

Returning to 1306, if the system confirmation is not to be recreated, the process determines whether to send the flattened data for analysis at 1310. If no, the process terminates thereafter.

While the operations illustrated in FIG. 13 are described as being performed by a computing device, such as, computing device 102 in FIG. 1, set of servers 222 in FIG. 2, or server 300 in FIG. 3, aspects of the disclosure contemplate that performance of the operations by other entities. For example, a cloud service may perform one or more of the operations.

Figure 14:
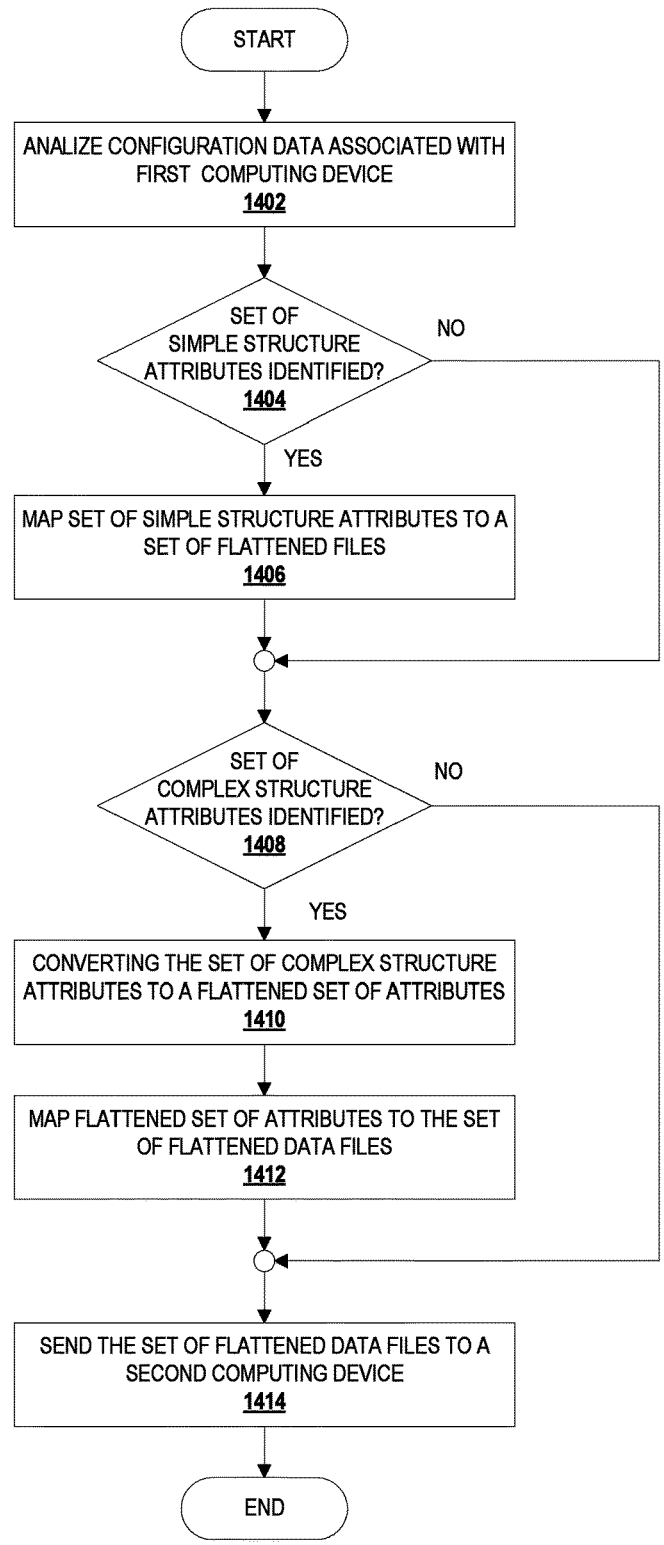
FIG. 14 is an exemplary flowchart illustrating performing a hash type conversion and an array type conversion.

FIG. 14 is an exemplary flowchart illustrating converting a set of objects including complex structure attributes into a set of flattened data files. The process shown in FIG. 14 may be implemented by a computing device, such as, but without limitation, computing device 102 in FIG. 1, set of servers 222 in FIG. 2, or server 300 in FIG. 3.

The process beings by analyzing configuration data associated with a first computing device at 1402. The process determines if a set of simple structure attributes are identified at 1404. If yes, the process maps the set of simple structure attributes to a set of flattened data files at 1406.

The process determines if a set of complex structure attributes are identified at 1408. If yes, the process converts the set of complex structure attributes to a flattened set of attributes at 1410. The process maps the flattened set of attributes to a set of flattened data files at 1412. The process sends the set of flattened data files to a second computing device at 1414. The process terminates thereafter.

While the operations illustrated in FIG. 14 are described as being performed by a computing device, such as, computing device 102 in FIG. 1, set of servers 222 in FIG. 2, or server 300 in FIG. 3, aspects of the disclosure contemplate that performance of the operations by other entities. For example, a cloud service may perform one or more of the operations.

Figure 15:
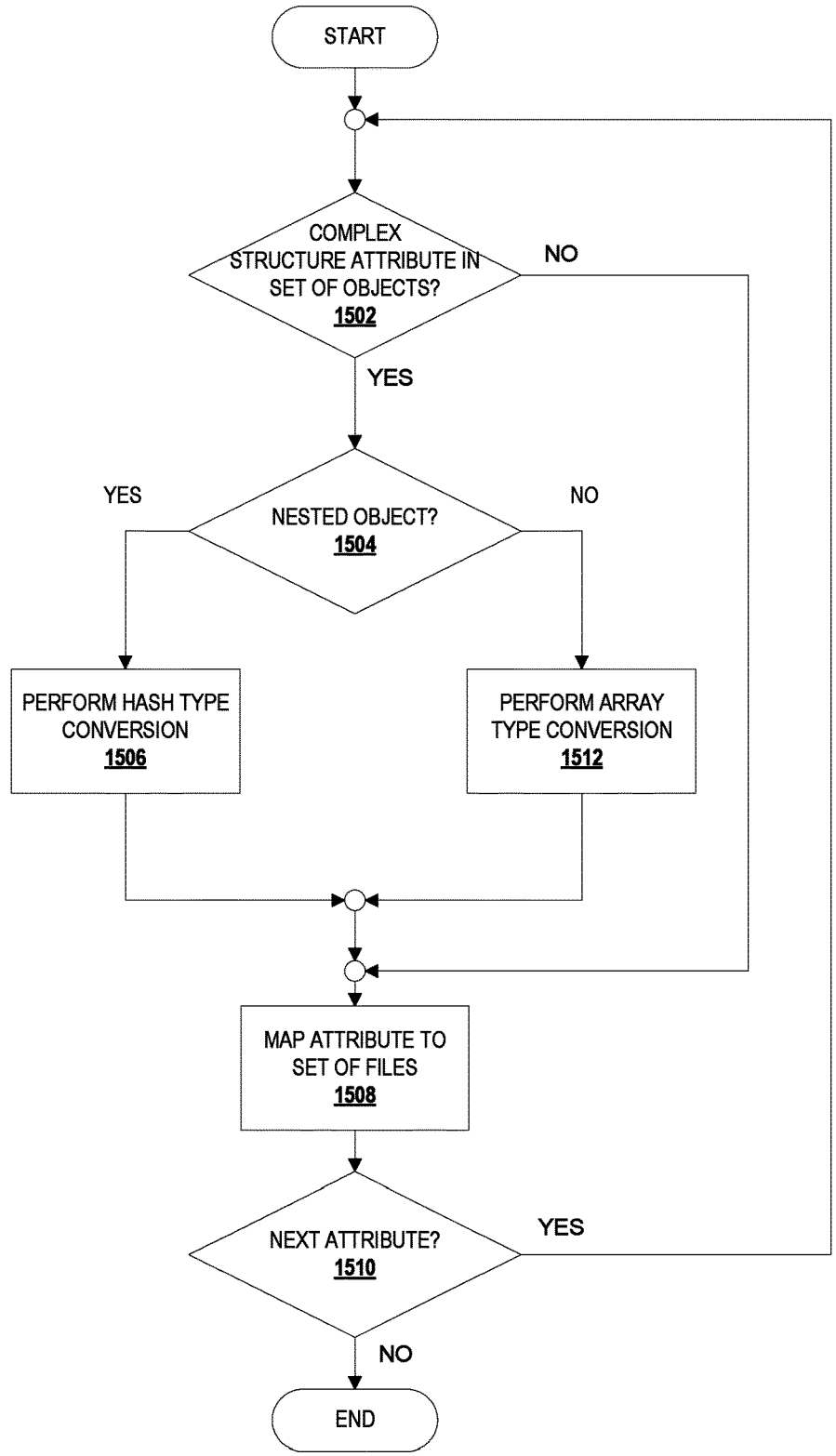
FIG. 15 is an exemplary flowchart illustrating a hash type conversion.

FIG. 15 is an exemplary flowchart illustrating performing a hash type conversion and array type conversion. The process shown in FIG. 14 may be implemented by a computing device, such as, but without limitation, computing device 102 in FIG. 1, set of servers 222 in FIG. 2, or server 300 in FIG. 3.

The process begins by determining if there is a complex structure attribute in the set of objects at 1502. If yes, the process determines if there is a nested object at 1504. If yes, the process performs a hash type conversion to flatten the attribute at 1506. The process then maps the attribute to the set of flattened data files at 1508.

The process determines if there is a next attribute at 1510. If yes, the process returns to 1502. If the next attribute is a complex structure attribute at 1502, the process determines if the attribute is a nested object at 1504. If no, the process performs an array type conversion at 1512. The process maps the attribute to the set of flattened data files at 1508.

The process determines if there is a next attribute at 1510. If yes, the process returns to 1502. If the attribute is not a complex structure attribute, it is a simple structure attribute and the process maps this attribute to the set of flattened data files at 1508.

The process recursively executes operations 1502 through 1512 until all attributes are flattened and mapped to the set of flattened data files. If there is not a next attribute to process at 1510, the process terminates thereafter.

While the operations illustrated in FIG. 15 are described as being performed by a computing device, such as, computing device 102 in FIG. 1, set of servers 222 in FIG. 2, or server 300 in FIG. 3, aspects of the disclosure contemplate that performance of the operations by other entities. For example, a cloud service may perform one or more of the operations.

Figure 16:
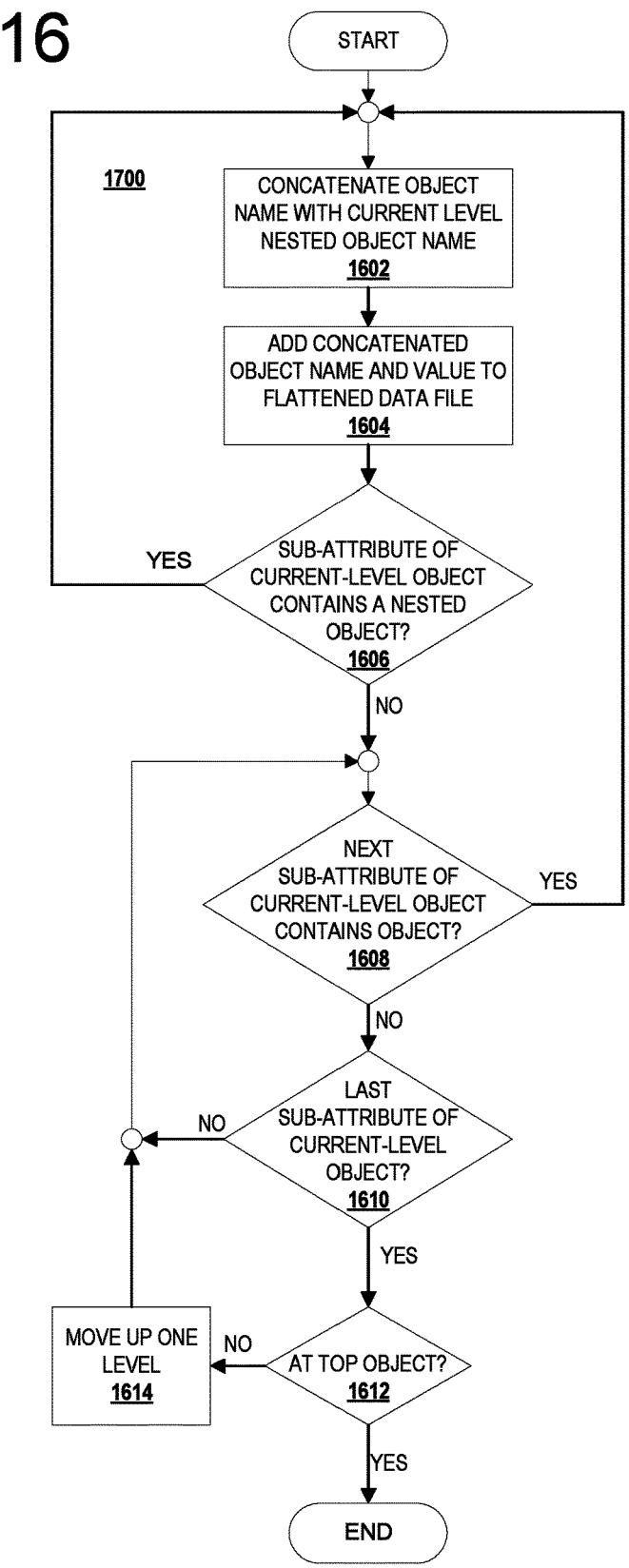
FIG. 16 is an exemplary flowchart illustrating an array type conversion.

FIG. 16 is an exemplary flowchart illustrating a hash type conversion. The process shown in FIG. 16 may be implemented by a computing device, such as, but without limitation, computing device 102 in FIG. 1, set of servers 222 in FIG. 2, or server 300 in FIG. 3.

The process begins by concatenating an object name with a current-level nested object name at 1602. The process adds the concatenated object name and corresponding value to the flattened data file at 1604. The process determines whether a sub-attribute of the current-level nested object contains a nested object at 1606. If yes, the process returns to 1602 and recursively executes operations 1602 through 1606 until all nested object names are concatenated and added to the flattened data file.

Returning to 1606, if an attribute of a current-level object does not contain a nested object, the process determines whether a next sub-attribute of a current-level object contains an object at 1608. If yes, the process returns to 1602 and recursively execute operations 1602 through 1608 until the next sub-attribute of the current-level object does not contain another nested object. The process then determines whether this is the last sub-attribute of the current-level object at 1610. If no, the process returns to 1608 and recursively executes operations 1602 through 1610 until the last sub-attribute of the current-level object is reached at 1610.

The process determines whether this is a top level object at 1612. If no, the process moves up one level at 1614 to the object at the previous level and continues executing operations 1602 through 1612. On determining the process has arrived at the top level object at 1612, the process terminates thereafter.

While the operations illustrated in FIG. 16 are described as being performed by a computing device, such as, computing device 102 in FIG. 1, set of servers 222 in FIG. 2, or server 300 in FIG. 3, aspects of the disclosure contemplate that performance of the operations by other entities. For example, a cloud service may perform one or more of the operations.

In the example shown in FIG. 16, a hash type conversion process determines whether a sub-attribute of an object contains a nested object. However, in other embodiments, an array type conversion process also determines whether a sub-attribute of an object contains a nested array sub-attribute. If the sub-attribute of an object does contain a nested array sub-attribute, the process performs an array type conversion process to flatten the nested array sub-attributes, as shown in FIG. 15 above and in FIG. 17 below.

Figure 17:
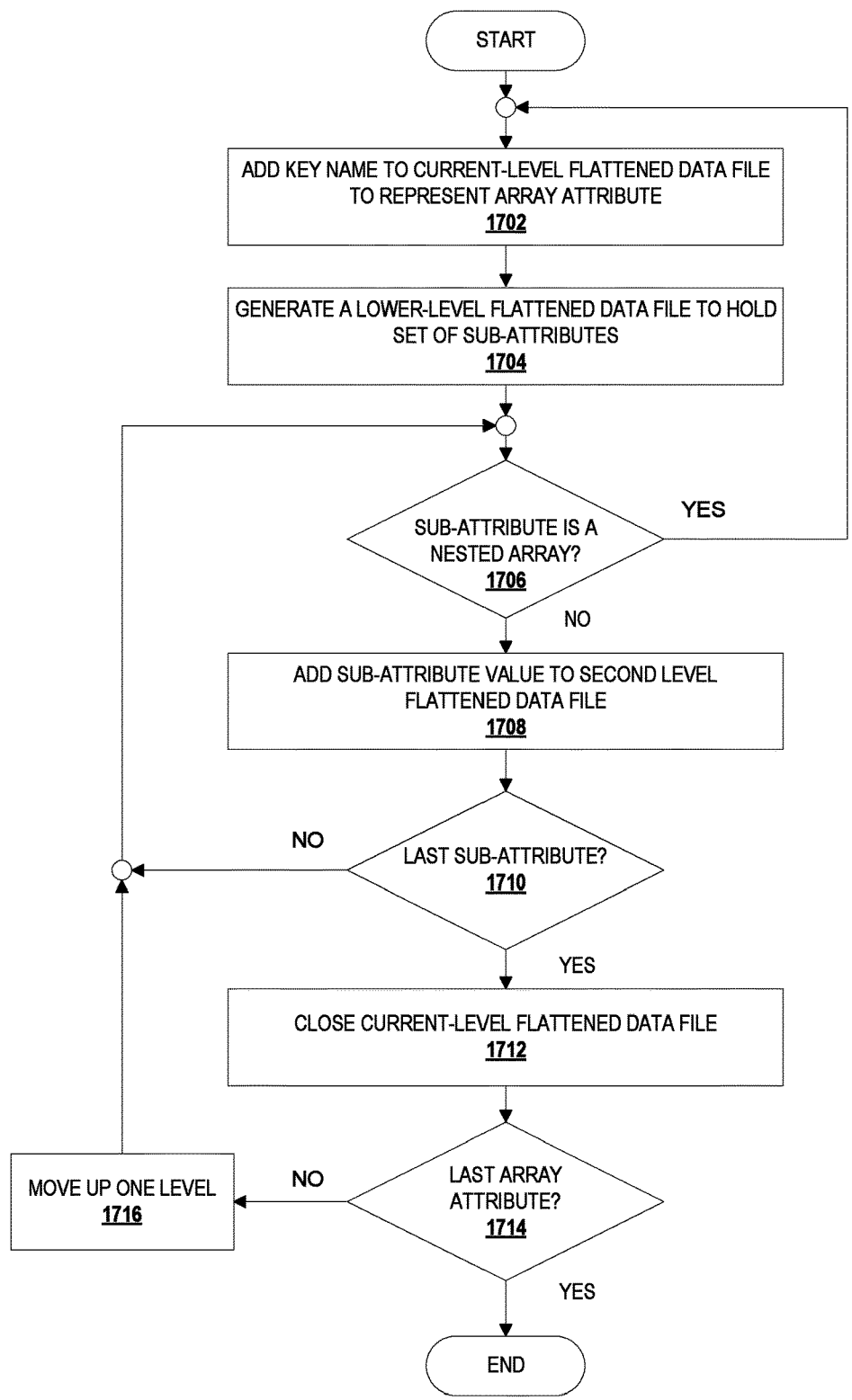
FIG. 17 is an exemplary flowchart illustrating expanding the flattened data files into complex structure attributes associated with a set of objects.

FIG. 17 is an exemplary flowchart illustrating an array type conversion. The process shown in FIG. 17 may be implemented by a computing device, such as, but without limitation, computing device 102 in FIG. 1, set of servers 222 in FIG. 2, or server 300 in FIG. 3.

The process begins by adding a key name to a current level flattened data file to represent an array attribute at 1702. The process generates a lower-level flattened data file to hold a set of sub-attributes of the array attribute at 1704. The process determines if a sub-attribute in the set of sub-attributes is a nested array at 1706. If yes, the process returns to 1702 and recursively executes operations 1702 to 1706 until flattened data files are created for each sub-attribute that is a nested array.

Returning to 1706, if a sub-attribute does not contain another nested array sub-attribute, the process adds the sub-attribute value to the lower-level flattened data file at 1708. The process determines if this is the last sub-attribute in the set of sub-attributes at 1710. If yes, the process closes the current-level flattened data file at 1712. The process determines if this is the last array attribute at 1714. If yes, the process terminates thereafter.

Returning to 1714, if this is not the last array attribute, the process moves up one level at 1716 and continues executing operations 1706 through 1714 until each nested attribute and sub-attribute are processed by the array type conversion process.

While the operations illustrated in FIG. 17 are described as being performed by a computing device, such as, computing device 102 in FIG. 1, set of servers 222 in FIG. 2, or server 300 in FIG. 3, aspects of the disclosure contemplate that performance of the operations by other entities. For example, a cloud service may perform one or more of the operations.

FIG. 18 is an exemplary flowchart illustrating expanding the flattened data files into complex structure attributes associated with a set of objects. The process shown in FIG. 18 may be implemented by a computing device, such as, but without limitation, computing device 102 in FIG. 1, set of servers 222 in FIG. 2, or server 300 in FIG. 3.

The process receives flattened data at 1802. The process determines whether a set of hash type flattened data is identified at 1804. If yes, the process performs a hash type expansion process to convert the set of hash type flattened data into a set of complex structure attributes at 1806. The process determines whether a set of array attribute type flattened data is identified at 1808. If no, the process terminates thereafter.

Returning to 1808, if a set of array attribute type flattened data is identified, the process performs an array type expansion process to convert the set of array attribute type flattened data into a set of complex structure attributes at 1810 with process terminating thereafter.

While the operations illustrated in FIG. 18 are described as being performed by a computing device, such as, computing device 102 in FIG. 1, set of servers 222 in FIG. 2, or server 300 in FIG. 3, aspects of the disclosure contemplate that performance of the operations by other entities. For example, a cloud service may perform one or more of the operations.

In the example shown in FIG. 18, an expansion component receives flattened data at 1802. In this example, the flattened data is received or retrieved from data storage, such as a memory, disk, database, or other data structure. In other examples, the flattened data is received from another computing device and/or client.

In some examples, the operations illustrated in FIG. 13, FIG. 14, FIG. 15, FIG. 16, FIG. 17, and FIG. 18 may be implemented as software instructions, such as computer executable program code, encoded on a computer readable medium, in hardware programmed or designed to perform the operations, or both. For example, aspects of the disclosure may be implemented as a system on a chip or other circuitry including a plurality of interconnected, electrically conductive elements.

While aspects of the disclosure have been described in terms of various examples with their associated operations, a person skilled in the art would appreciate that a combination of operations from any number of different examples is also within scope of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable program code, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable program code, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer executable program code, such as program modules, executed by one or more computers or other devices in software, firmware, hardware, or a combination thereof. The computer executable program code may be organized into one or more computer executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer executable program code or the specific components or modules illustrated in the figures and described herein. Other examples of the disclosure may include different computer executable program code or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein, but within the scope of aspects of the disclosure, constitute exemplary means for flattening complex structure attributes. For example, the elements illustrated in FIG. 1, such as when encoded to perform the operations illustrated in FIG. 13, FIG. 14, FIG. 15, FIG. 16, FIG. 17 and FIG. 18, constitute exemplary means for analyzing data comprising a set of objects, exemplary means for mapping a set of simple structure attributes into a set of flattened data files, and exemplary means for converting a set of complex structure attributes to flattened attribute data, exemplary means for mapping the flattened attribute data to the set of flattened data files.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method executed by one or more processors, the method comprising:
    analyzing configuration data associated with a first computing device, by the one or more processors associated with a second computing device, the configuration data comprising a set of objects;
    on condition of identifying a set of simple structure attributes associated with the set of objects, mapping the set of simple structure attributes into a set of flattened data files; and
    on condition of identifying a set of complex structure attributes associated with the set of objects, converting the set of complex structure attributes to flattened attribute data, by a configuration capture component, the set of complex structure attributes comprising a set of nested object attributes and a set of nested array attributes, the converting of the set of complex structure attributes to the flattened attribute data including:
        (i) performing, by the configuration capture component, a hash type conversion on the set of nested object attributes by at least converting one or more nested object sub-attributes of each nested object attribute into a plurality of simple object sub-attributes in a same row of simple object sub-attributes; and
        (ii) performing, by the configuration capture component, an array type conversion on the set of nested array attributes by at least converting one or more nested array sub-attributes of each nested array attribute into a plurality of simple array sub-attributes in a same row of simple array sub-attributes, the flattened attribute data corresponding to at least the plurality of simple object sub-attributes and the plurality of simple array sub-attributes in the respective same rows;
    mapping the flattened attribute data to the set of flattened data files to create a snapshot of a system configuration of the first computing device, the flattened attribute data being configured to allow a reduced network bandwidth for transmission of the set of flattened data files; and
    transmitting, at the reduced network bandwidth, the set of flattened data files from the first computing device to the second computing device.

2. The computer-implemented method of claim 1, wherein the second computing device is a cloud server and further comprising:
    receiving, at the cloud server, the set of flattened data files from the first computing device via an Internet connection, wherein the cloud server transmits the set of flattened data files to a third computing device associated with a business intelligence analyzer for analysis via the Internet connection.

3. The computer implemented method of claim 1, wherein the set of flattened data files is a first set of flattened data files and further comprising:
    receiving a second set of flattened data files; and
    converting the second set of flattened data files into a set of objects having a set of complex structure attributes.

4. The computer-implemented method of claim 1, further comprising:
    receiving the set of objects from a client in a set of responses via a representational state transfer (REST) application programming interface (API), wherein the set of objects further comprises a set of REST objects.

5. The computer-implemented method of claim 1, wherein performing the array type conversion on the set of nested array attributes further comprises:
    identifying a nested array attribute in the set of complex structure attributes;
    generating a first level flattened data file and a second level flattened data file in the set of flattened data files;
    assigning an array key to the identified nested array attribute;
    adding the array key and an attribute name of the identified nested array attribute to the first level flattened data file; and
    adding the array key and a plurality of values associated with the identified nested array attribute into the second level flattened data file.

6. The computer-implemented method of claim 5, wherein the plurality of values associated with the identified nested array attribute comprises a respective nested array sub-attribute, and further comprising:
    generating a third level flattened data file in the set of flattened data files corresponding to the respective nested array sub-attribute;
    assigning a nested array key to the respective nested array sub-attribute;
    adding the nested array key to the second level flattened data file; and
    adding the nested array key and a plurality of values associated with the respective nested array sub-attribute to the third level flattened data file.

7. The computer-implemented method of claim 1, wherein the same row of simple object sub-attributes includes one of an attribute name row and an attribute value row, and wherein performing the hash type conversion on the set of nested object attributes further comprises:
    identifying a nested object attribute in the set of complex structure attributes, wherein the identified nested object attribute comprises a set of nested object sub-attributes and a set of values associated with the set of nested object sub-attributes;
    generating a respective flattened data file in the set of flattened data files corresponding to the identified nested object attribute;
    recursively processing every nested object sub-attribute in the set of nested object sub-attributes, wherein processing a respective nested object sub-attribute in the set of nested object sub-attributes comprises:
        concatenating a name of the identified nested object attribute with a name of the respective nested object sub-attribute to form a concatenated nested object sub-attribute name;
        adding the concatenated nested object sub-attribute name to the attribute name row of the flattened data file; and adding a value corresponding to the respective nested object sub-attribute to the attribute value row of the flattened data file.

8. The computer-implemented method of claim 7, wherein a respective nested object sub-attribute of the identified nested object attribute is an array sub-attribute to form a nested array, and further comprising:
generating a first level flattened data file and a second level flattened data file in the set of flattened data files associated with the nested array;
assigning a nested array key to the nested array;
adding the nested array key and a name of the identified nested object attribute to the first level flattened data file; and
adding the array key and a plurality of values associated with the nested array into the second level flattened data file.

9. A computing device comprising:
one or more processors;
a memory coupled to the one or more processors, the memory storing a configuration capture component; and
an application programming interface (API), the API configured to receive data from a client, the data comprising a set of objects including a set of complex structure attributes, the set of complex structure attributes comprising a set of nested object attributes, a nested object attribute in the set of nested object attributes comprising at least one sub-attribute,
wherein the one or more processors (i) execute the configuration capture component to perform a hash type conversion on the nested object attribute by at least converting one or more nested object sub-attributes of the nested object attribute into a plurality of simple object sub-attributes in a same row of simple object sub-attributes to generate a flattened data file in a set of flattened data files corresponding to the nested object attribute, the flattened data file being configured to allow a reduced network bandwidth for transmission of the set of flattened data files, and (ii) transmit, at the reduced network bandwidth, the set of flattened data files to a business intelligence analyzer for analysis,
wherein the same row of simple object sub-attributes includes one of an attribute name row and an attribute value row, and
wherein the flattened data file comprise:
the attribute name row comprising a name of the nested object attribute and at least one concatenated sub-attribute name; and
the attribute value row of the flattened data file comprising at least one value corresponding to the at least one sub-attribute.

10. The computing device of claim 9, wherein the API further comprises a representational state transfer (REST) API.

11. The computing device of claim 9, wherein the configuration capture component further comprises:
an expansion component, the one or more processors executing the expansion component to receive a second set of flattened data files and convert the second set of flattened data files into a second set of objects including a second set of complex structure attributes.

12. The computing device of claim 9, wherein the flattened data file associated with the nested object attribute is a comma separated value (CSV) file in a set of CSV files.

13. The computing device of claim 9, wherein the client is a first client and further comprising:
a configuration recreation component executing on the one or more processors to recreate a system configuration of the first client on a second client using the set of flattened data files.

14. The computing device of claim 9, wherein the set of complex structure attributes comprises a nested array attribute and further comprising:
an array type conversion component associated with the configuration capture component, the one or more processors executing the array type conversion component to generate a first level flattened data file and a second level flattened data file corresponding to the nested array attribute, the first level flattened data file comprising a name of the nested array attribute and a key; and
wherein the second level flattened data file comprises the key and a plurality of values associated with the nested array attribute.

15. The computing device of claim 14, wherein the plurality of values further comprises a nested array and further comprising:
a third level flattened data file associated with the nested array, the third level flattened data file comprising a nested array key and a plurality of values associated with the nested array, wherein the second level flattened data file further comprises a name of the nested array and the nested array key,
wherein the set of flattened data files includes the first level flattened data file, the second level flattened data file, and the third level flattened data file, and
wherein each of the first level flattened data file, the second level flattened data file, and the third level flattened data file is configured to further allow the reduced network bandwidth for transmission of the set of flattened data files.

16. One or more computer storage media embodying computer executable instructions that, when executed, cause at least one processor to:
receive configuration data comprising a set of objects, the configuration data associated with a system configuration of a first computing device;
on condition of identifying a nested array attribute associated with the set of objects, perform an array type conversion on the nested array attribute to (i) at least convert one or more nested array sub-attributes of the nested array attribute into a plurality of simple array sub-attributes, the plurality of simple array sub-attributes including an array key, an attribute name of the nested array attribute, and a plurality of values associated with the nested array attribute, (ii) populate the first level flattened data file with the array key and the attribute name of the nested array attribute, and (iii) populate the second level flattened data file with the array key, and the plurality of values associated with the nested array attribute in a same row of values in the second level flattened data file, the first level flattened data file and the second level flattened data file comprising a set of flattened data files, the first level flattened data file and the second level flattened data file being configured to allow a reduced network bandwidth for transmission of the set of flattened data files; and
transmit, at the reduced network bandwidth, the set of flattened data files to a configuration recreation component to recreate the system configuration of the first computing device on a second computing device utilizing the set of flattened data files.

17. The one or more computer storage media of claim 16, wherein the instructions are further executed to cause the at least one processor to:

on condition of identifying a simple structure attribute associated with the set of objects, map the identified simple structure attribute to a respective flattened data file corresponding to an object associated with the identified simple structure attribute.

18. The one or more computer storage media of claim 16, wherein the instructions are further executed to cause the at least one processor to:

on condition of identifying an object in the set of objects having a nested object attribute in a set of complex structure attributes, perform a hash type conversion on the nested object attribute, wherein the nested object attribute comprises a set of sub-attributes embedded within the nested object attribute, and wherein each sub-attribute is associated with a value to form a set of values, and wherein a hash type conversion component is further executed to:

generate a flattened data file associated with the nested object;

recursively concatenate a name of the nested object attribute with a name of a sub-attribute to form a sub-attribute name, until all sub-attribute names are concatenated to form a set of sub-attribute names;

populate an attribute name row of the flattened data file with the set of sub-attribute names; and populate an attribute value row of the flattened data file with the set of values associated with the set of sub-attributes.

19. The one or more computer storage media of claim 16, wherein the set of flattened data files is a set of comma separated value (CSV) files.

20. The one or more computer storage media of claim 16, wherein the instructions are further executed to cause the at least one processor to:

convert the set of flattened data files back into the set of objects including a set of complex structure attributes.

\* \* \* \* \*